United States Patent [19]

Taniguchi et al.

[11] Patent Number: 5,187,604
[45] Date of Patent: Feb. 16, 1993

[54] MULTI-LAYER EXTERNAL TERMINALS OF LIQUID CRYSTAL DISPLAYS WITH THIN-FILM TRANSISTORS

[75] Inventors: Hideaki Taniguchi, Mobara; Hirofumi Kunitou; Ryouji Oritsuki, both of Chiba; Akira Sasano, Tokyo, all of Japan

[73] Assignee: Hitachi, Ltd., Tokyo, Japan

[21] Appl. No.: 464,191

[22] Filed: Jan. 29, 1990

[30] Foreign Application Priority Data

Jan. 18, 1989 [JP] Japan ............................. 1-7615
Mar. 13, 1989 [JP] Japan ............................. 1-62908

[51] Int. Cl.$^5$ .............................................. G02F 1/13
[52] U.S. Cl. ................................... 359/88; 359/54; 359/87
[58] Field of Search ............ 350/334, 336, 339 R; 359/88, 87, 54

[56] References Cited

U.S. PATENT DOCUMENTS

| | | | |
|---|---|---|---|
| 4,640,581 | 2/1987 | Nakanowatari et al. | |
| 4,772,099 | 9/1988 | Kato et al. | 350/334 |
| 4,842,373 | 6/1989 | Tomofuji et al. | 350/336 |
| 4,853,296 | 8/1989 | Fukuyoshi | 359/87 |

FOREIGN PATENT DOCUMENTS

| | | | |
|---|---|---|---|
| 0076051 | 6/1977 | Japan | 350/334 |
| 0159197 | 12/1979 | Japan | 350/336 |
| 0167924 | 7/1986 | Japan | 350/334 |
| 0228421 | 10/1986 | Japan | 350/334 |
| 62-124529 | 6/1987 | Japan | 350/334 |

Primary Examiner—William L. Sikes
Assistant Examiner—Huy K. Mai
Attorney, Agent, or Firm—Antonelli, Terry, Stout & Kraus

[57] ABSTRACT

An active matrix liquid crystal device is provided with improved external terminal structures including an ITO (indiumtin-oxide) pad covering an interconnection wiring, and a layout of a passivation film for protecting an aluminium wiring from outer moisture.

13 Claims, 22 Drawing Sheets

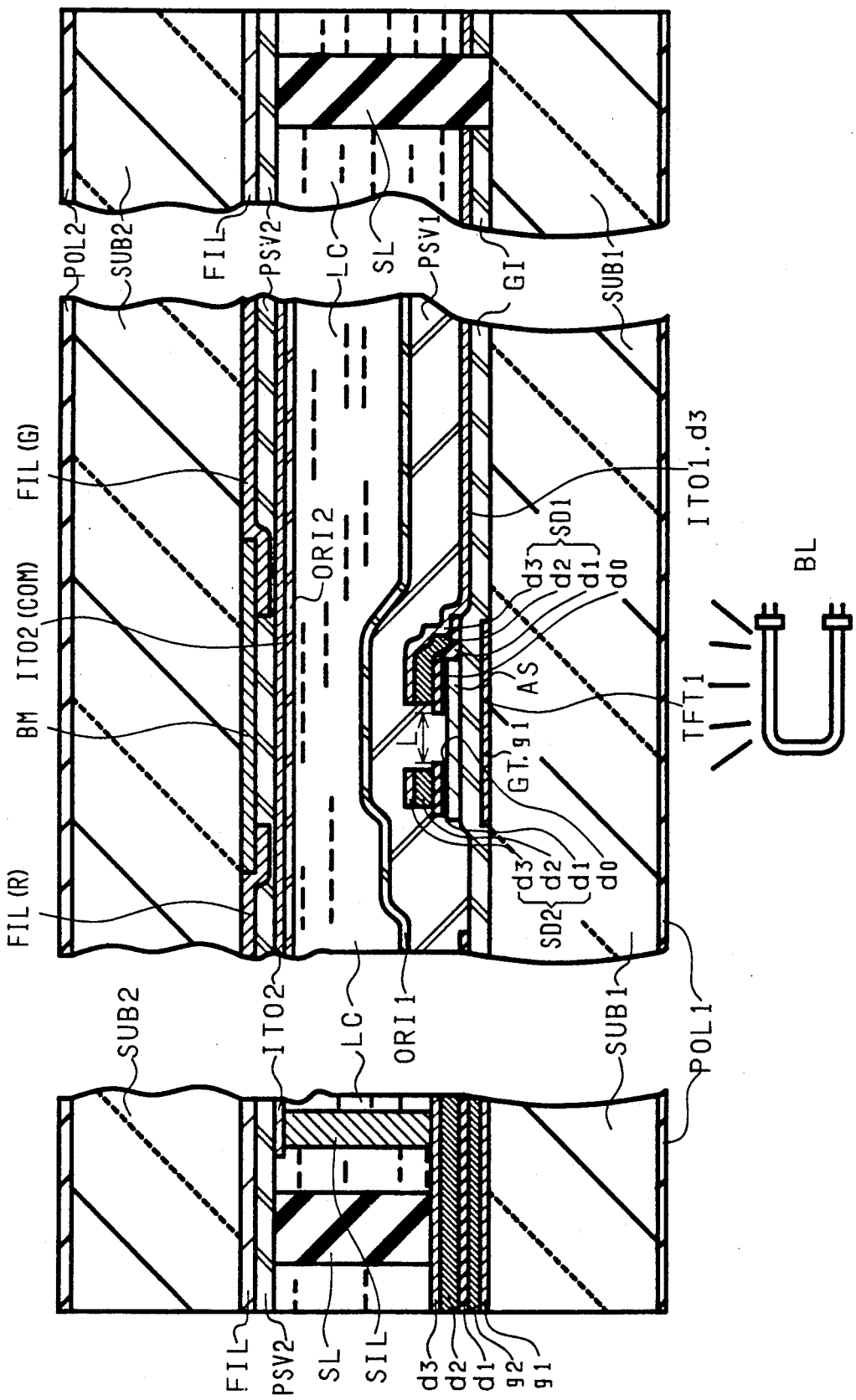

MULTI-LAYER EXTERNAL TERMINALS OF LIQUID CRYSTAL DISPLAYS WITH THIN-FILM TRANSISTORS

BACKGROUND OF THE INVENTION

1. Field of the Invention

The present invention relates to thin-film circuit devices, particularly to active matrix liquid crystal display devices with thin-film transistors (TFTs).

2. Description of Prior Arts

Active matrix liquid crystal displays using TFTs as switching elements at each picture-cell (pixel) are disclosed in, for example, pp. 193 to 200 of NIKKEI ELECTRONICS published on Dec. 15, 1986 by Nikkei McGraw-Hill Co. Ltd.

SUMMARY OF THE INVENTION

It is an object of the present invention to provide a thin-film circuit device having an external connection terminal with a high reliability.

According to an embodiment of the present invention, there is provided a TFT active matrix including an external terminal with an ITO(Induim-Tin-Oxide) pad covering an inteconnection wiring to protect the wiring from electrical corrosion due to such as moisture atmosphere.

BRIEF DESCRIPTION OF THE DRAWINGS

FIGS. 1(a) to 1(c) are diagram for assistance in explaining a method of manufacturing an active matrix color liquid crystal display device of the present invention, while

FIG. 2B is a sectional view of a portion peripheral to a seal part and a portion cut by a cutting line IIB—IIB of FIG. 2A;

FIGS. 13(a) to 13(l) are diagram for assistance in explaining another method of manufacturing the active matrix color liquid crystal display device, while FIGS. 13(j) to 13(m) show a variation.

Figure 1A:
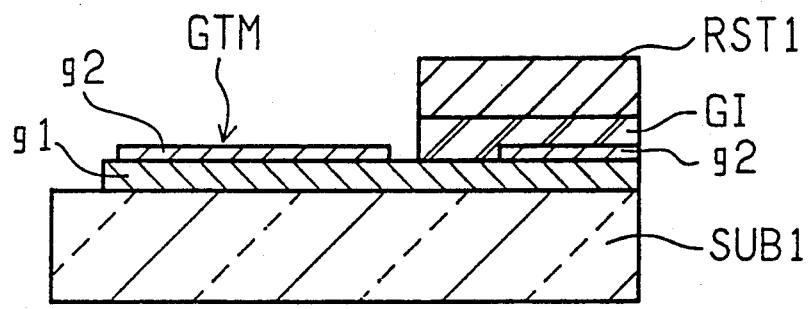

The following terms are used in the drawings for explaining elements of the invention:
SUB . . . transparent glass substrate
GL . . . scanning signal line
DL . . . image signal line
GI . . . insulating film
GT . . . gate electrode
AS . . . i-type semiconductor layer
SD . . . source or drain electrode
PSV . . . protective film
BM . . . light shielding film
LC . . . liquid crystal
TFT . . . thin film transistor
ITO . . . transparent pixel electrode
g, d . . . conductive film
Cadd . . . holding capacity element
Cgs . . . superposition capacity
Cpix . . . liquid crystal capacity
GTM . . . gate terminal
1 . . . drain terminal
4 . . . ITO film.

DETAILED DESCRIPTION OF THE PREFERRED EMBODIMENTS

EMBODIMENT

PIXEL LAYOUT

Figure 2A:
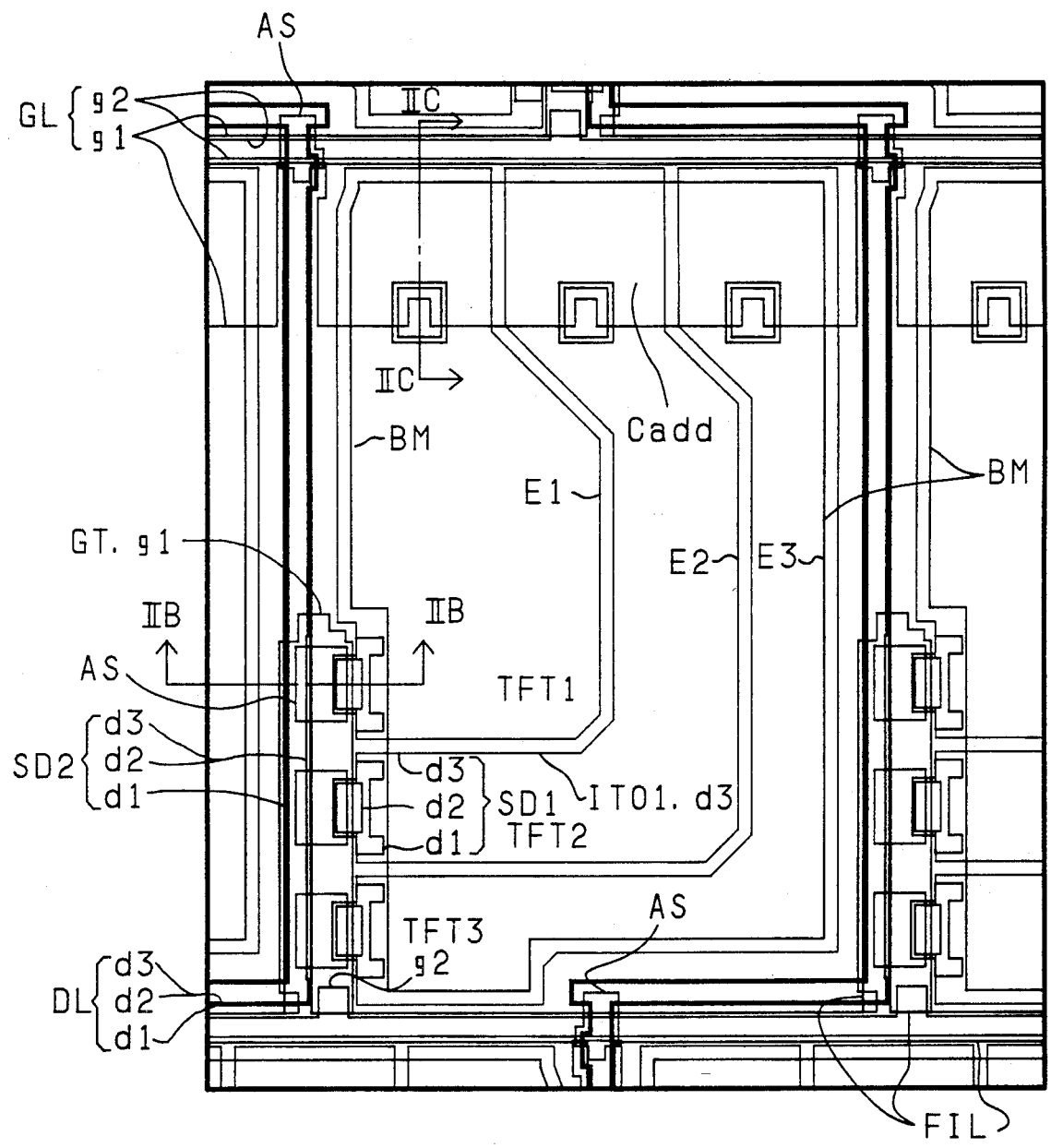
FIG. 2A is a principal plan view depicting one pixel of a liquid crystal display unit of the active matrix color liquid crystal display device to which the present invention is applied.
Figure 2C:
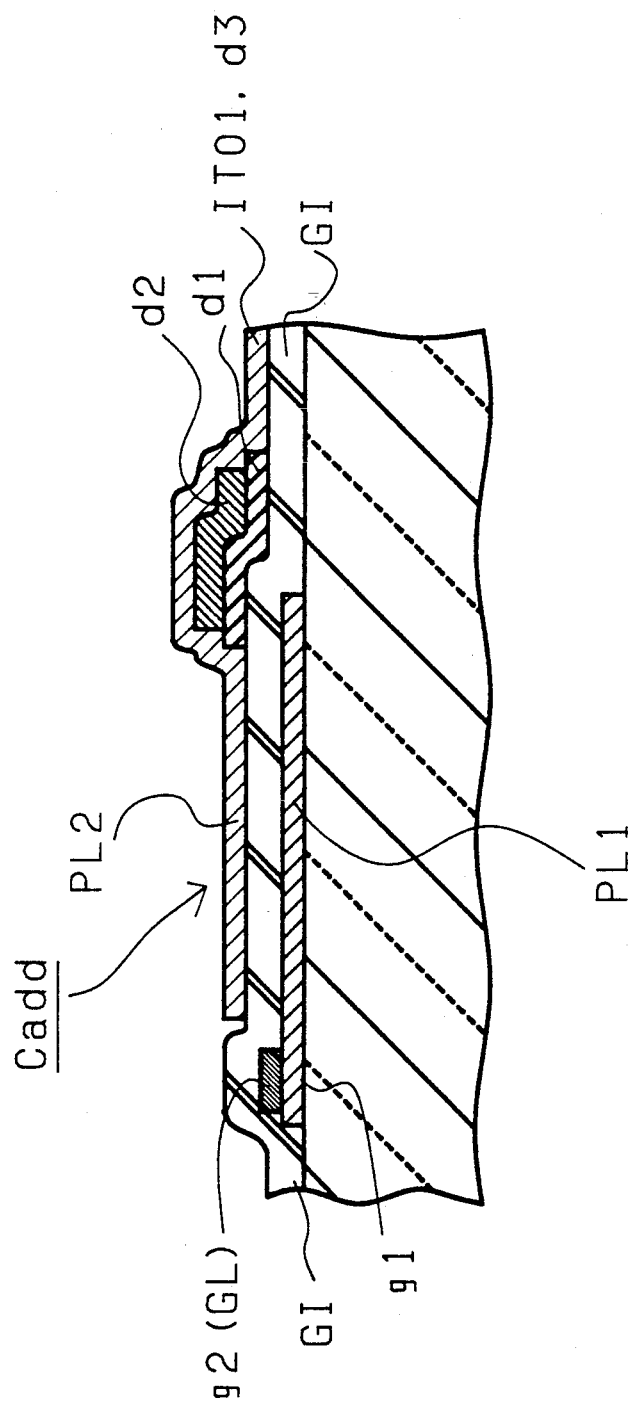
FIG. 2C is a section cut by a cutting line IIC—IIC of FIG. 2A.

As depicted in FIG. 2A, each individual pixel is disposed in an intersection region (a region surrounded by four signal lines) defined by two adjacent scanning signal lines (gate or horizontal signal lines) GL and two adjacent image signal lines (drain or vertical signal lines) DL. Each individual pixel includes a thin film transistor TFT, a pixel electrode ITO and a holding capacity element Cadd. The plurality of scanning signal lines GL extending in the row-direction are disposed in the column-direction, while the plurality of image signal lines DL extending in the column-direction are disposed in the row-direction.

STRACTURE OF A PANEL IN SECTION

As illustrated in FIG. 2B, on the basis of the layer of a liquid crystal LC, a thin film transistor TFT and a transparent pixel electrode ITO are formed on the side of lower transparent glass substrate SUB1, a color filter FIL and a black matrix patern BM for shielding light are formed on the side of a upper transparent glass substrate SUB2. The lower transparent glass substrate SUB1 is shaped with a thickness of, e.g., approximately 1.1 (mm). Referring to FIG. 2B, the central part thereof illustrates one pixel in section; the left part thereof illustrates a section, in which the outside extension wire is provided, of the left fringes of the transparent glass substrates SUB1 and SUB2; and the right part thereof illustrates a section, in which no outside extension wire is provided, of the right fringes of the transparent glass substrates SUB1 and SUB2.

Sealing materials SL shown on the right and left sides of FIG. 2B are designed for sealing the liquid crystal LC. The sealing materials SL are provided along the entire fringes of the transparent glass substrates SUB1 and SUB2 except for a liquid crystal sealing port (not illustrated). The sealing material SL is formed of, e.g., epoxy resin.

The common transparent pixel electrode ITO2 on the side of the upper transparent glass substrate SUB2 is connected leastwise at one portion to the outside extension wire formed of a silver paste material SIL on the side of the lower transparent glass substrate SUB1. The outside extension wire is formed in the same process as those of the gate electrode GT, the source electrode SD1 and the drain electrode SD2.

Formed inside the sealing materials SL are layers of the orientaion films ORI1 and ORI2, the transparent pixel electrode ITO1, the common transparent pixel electrode ITO2, the protection films PSV1 and PSV2 and the insulating film GI. Polarization plates POL are placed on the outer surfaces of the lower and upper transparent glass substrates SUB1 and SUB2.

The liquid crystal LC is sealed in a lower orientation film ORI1 and an upper orientaion film ORI2 which prescribes the orientation of liquid crystal moleculer and is sealed by sealing materials SL.

The lower orientation film ORI1 is formed on the upper portion of the protection film PSV1 provided on the side of the lower transparent glass substrate SUB1.

Sequentially laminated on the inside (on the side of liquid crystal) surface of the upper transparent glass substrate SUB2 are a color filter FIL, the protection film PSV2, the common transparent pixel electrode (COM) ITO2 and the upper orientation film ORI2.

The assembly of this liquid crystal display device involves the steps of separately forming layers on the side of lower transparent glass substrate SUB1 and the upper transparent glass substrate SUB2, superposing the lower and upper transparent glass substrates SUB1 and SUB2 on each other, and sealing the liquid crystal LC therebetween.

THIN FILM TRANSISTOR TFT

The thin film transistor TFT operates such that when applying a positive bias to the gate electrode GT, a channel resistance between the source and the drain decreases, and if the bias becomes zero, the channel resistance increases. The thin film transistor TFT of every pixel is split into three (plural numbers) segments within the pixel, viz., this transistor TFT is composed of thin film transistors (divided thin film transistors) TFT1, TFT2 and TFT3. Each of the thin film transistors TFT1 to TFT3 is shaped virtually in the same size (the width is equal to a channel length). Each of the divided thin film transistors TFT1 to TFT3 is formed mainly of a gate electrode GT, and insulating film GI, and an i-type (intrinsic conductive type deterministic impurities are not doped) amorphous Si semiconductor layer AS, and a couple of source electrode SD1 and drain electrode SD2. Note that the source/drain is originally determined by a bias polarity therebetween, but the source/drain is, it should be understood, interchangeable during the operation, because the polarity is inversed during the operation in a circuit of the titled device of this specification. In the following description, however, one is fixedly expressed as a source, and the other a drain for convenience.

GATE ELECTRODE GT

Figure 4:
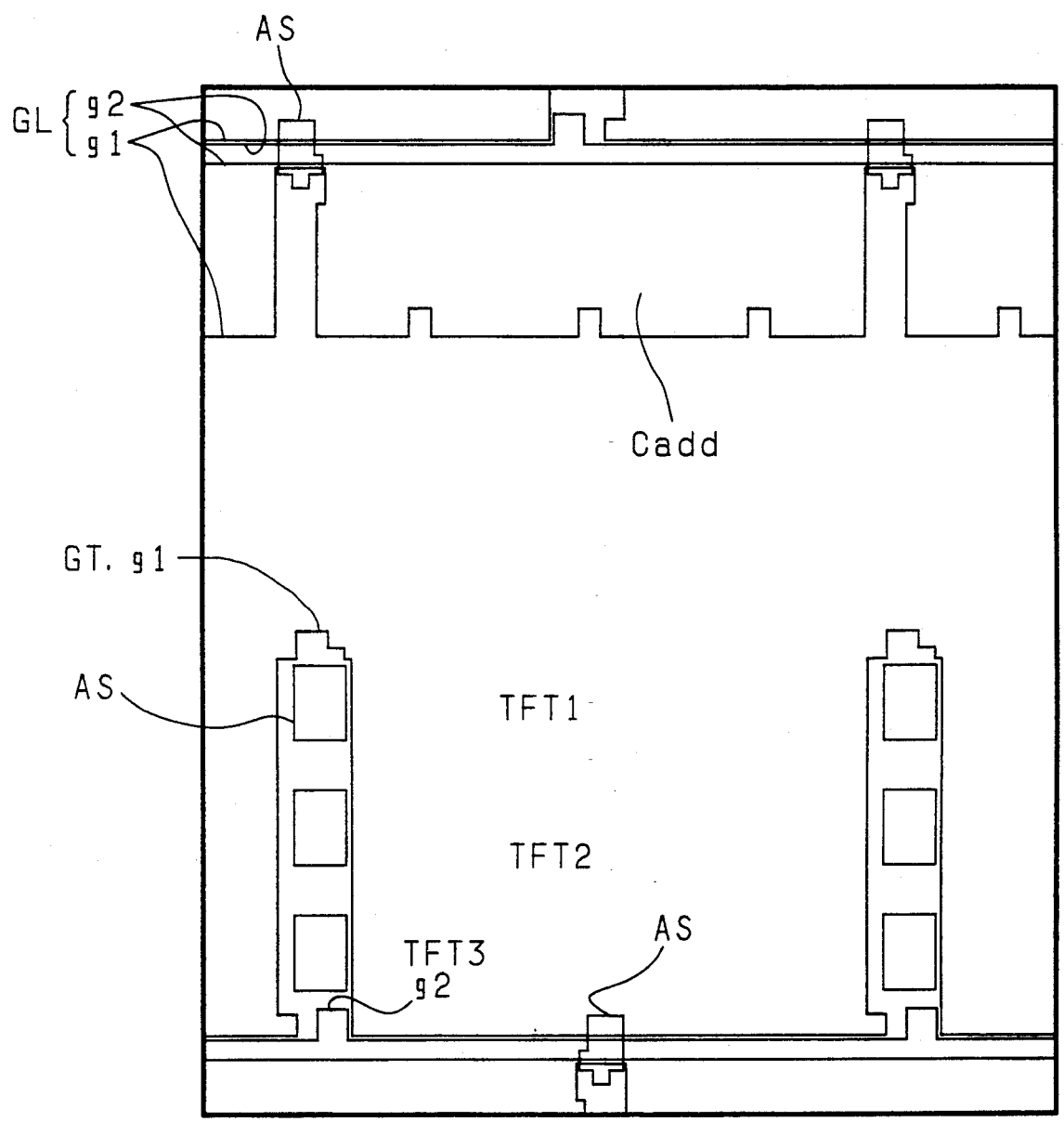
FIGS. 4 through 6 are plan views each depicting a predetermined layer of the pixel shown in FIG. 2A.

The gate electrode GT is, as fully illustrated in FIG. 4 (a plan view of the layers g1, g2 and AS in FIG. 2A), formed to assume a T-shape (i.e., it branches off in the T-like configuration) to protrusively extend from the scanning signal line GL in the column-direction (i.e., an upper direction in FIGS. 2A and 4). Namely, the gate electrode GT is arranged to extend virtually in parallel with the image signal line DL. The gate electrodes GT are also arranged to protrusively extend to regions in which the respective thin film transistors TFT1 to TFT3 are formed. The gate electrodes of the thin film transistors TFT1 to TFT3 are formed into one united body (as a common gate electrode) in continuation from the same scanning signal line GL. The gate layered electrode GT consists of a first single layered conductive film g1 so as to minimize the possibility of forming a large stepped portion in the forming region of the thin film transistor TFT. The formation of the first conductive film g1 involves the use of, for instance, a chromium (Cr) film having a thickness of approximately 1000 (Å) on the basis of sputtering.

It can be observed from FIGS. 2A, 2B and 4 that the gate electrode GT is shaped sufficiently larger than the semiconductor layer AS to completely cover this layer AS (when viewing from below). Where a backlight such as a fluorescent lamp or the like is provided underneath the substrate SUB1, the nontransparent Cr gate electrode GT overshadows the semiconductor layer AS, with the result that no backlight strikes upon the layer AS. Hence, a conductive phenomenon caused by the irradiation of light, i.e., the deterioration of OFF-characteristics, is unlikely to occur. In connection with an original size of the gate electrode GT, this electrode GT has a minimum width (including an allowance for positioning the gate electrode and the source/drain electrodes) required to span the source/drain electrodes SD1 and SD2; and a length thereof which determines a channel width W depends upon a ratio with respect to a distance L (a channel length) between the source electrode and the drain electrode, i.e., such a length is conditional on a factor of W/L which determines a mutual conductance gm.

The configuration of the gate electrode employed in this embodiment is, as a matter of course, more than the original one.

If the gate electrode is put into consideration in terms of only a gate function and a light shielding function as well, the gate electrode and the line GL cooperate with a single layer to form one united body. In this case, as an non-transparent conductive material, Al containing Si, pure Al or Al containing Pd may be selected.

SCANNING SIGNAL LINE GL

The scanning signal line GL consists of a composite film of the first conductive film g1 and the second conductive film g2 superposed thereon. The first conductive film g1 of the scanning signal line GL is formed in the same manufacturing process as that of the first conductive film g1 of the gate electrode GT, and is also arranged to be integral therewith. Based on the sputtering technique, the second conductive film g2 is formed of, e.g., an aluminum (Al) film which is 1000 to 5500 (Å) in thickness. The second conductive film g2 serves to decrease a resistance value of the scanning signal line GL and is capable of increasing a velocity (a writing characteristic of information on the pixels) at which a signal is transmitted.

The scanning signal line GL is arranged such that the second conductive film g2 has a width smaller than that of the first conductive film g1. That is, the scanning signal line GL is formed so as to level the surface of an insulating film GI superposed thereon, because a stepped configuration of the side wall may be moderated.

GATE INSULATING FILM GI

The insulating film GI serves as a gate insulating film for each of the thin film transistors TFT1 to TFT3. The insulating films GI are disposed on the gate electrode GT and the scanning signal line GL. The formation of the insulating film GI involves the use of, e.g., a silicon nitride film having a thickness of 3000 (Å) or thereabouts on the basis of plasma CDV.

SEMICONDUCTOR LAYER AS

The i-type semiconductor layer AS is, as fully depicted in FIG. 4, employed as a channel forming region of each of the plurality of divided thin film transistors TFT1 to TFT3. The i-type semiconductor layer AS is formed of an amorphous silicon film or a polycrystalline silicon film, the thickness of which is approximately 1800 (Å).

The i-type semiconductor layer AS is formed subsequent to the formation of the $Si_3N_4$ gate insulating film GI in the same plasma CVD apparatus, changing supply gas components in such a manner that the substrate SUB1 is not exposed to the outside of the plasma CVD apparatus. Similarly, d0 (FIG. 2B) and an $N^+$ layer in which p for ohmic contact is doped are successively formed with a thickness of about 400 (Å). Subsequent to this step, the substrate SUB1 is taken out of the CVD device, the $N^+$-layer d0 and the i-layer AS are subjected to patterning to form independent insular portions shown in FIGS. 2A, 2B and 4 by employing a photo-processing technique.

The i-type semiconductor layer AS, as depicted in detail in FIG. 2A and 4, extends to the intersection (a crossover) between the scanning signal line GL and the image signal line DL. The thus extended i-type semiconductor layer AS is intended to diminish the possibility of a short-circuit occurring between the scanning signal line GL and the image signal line DL at the intersection.

SOURCE.DRAIN ELECTRODES SD1, SD2

Figure 5:
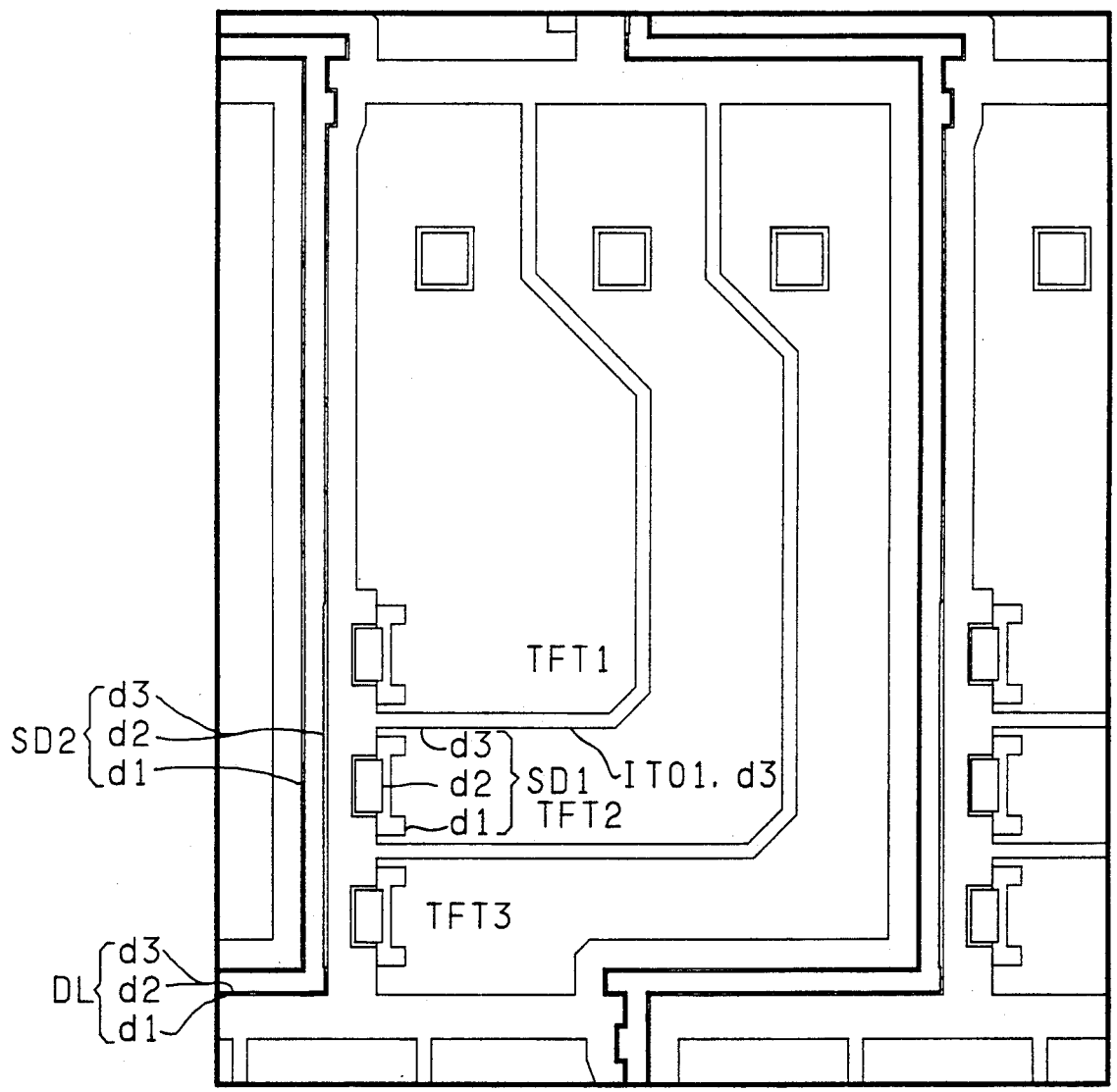

The source electrode SD1 and the drain electrode SD2 of each of the plurality of divided thin film transistors TFT1 through TFT3 of the pixel are, as fully illustrated in FIGS. 2A, 2B and 5 (a plan view of the layers d1~d3 in FIG. 2A), so disposed on the i-type semiconductor layer AS as to be spaced away from each other.

Each of the source electrode SD1 and the drain electrode SD2 is so arranged that a first conductive film d1, a second conductive film d2 and a third conductive film d3 are sequentially superposed from the lower layer contiguous to the $N^+$-type semiconductor layer d0. The first second and third conductive films d1, d2 and d3 of the source electrode SD1 are formed in the same process as that of the drain electrode SD2.

The first conductive film d1 is composed of a chromium film shaped by sputtering, the thickness of which is 500 to 1000 (Å) (approximately 600 (Å) in this embodiment). The chromium film has such properties that the stress increases, if the film thickness becomes large. Therefore, the thickness must fall within a range of about 2000 (Å). The chromium film has a favourable contact condition with respect to the $N^+$-type semiconductor layer d0. The chromium film also performs a function to prevent aluminium contained in the second conductive film d2 which will be mentioned later from diffusing into the $N^+$-type semiconductor layer d0 by forming a so-called barrier layer. In addition to the chromium film, the formation of the first conductive film d1 may involve the use of a high melting point metal (Mo, Ti, Ta and W) film, and/or a high melting point metal silicide ($MoSi_2$, $TiSi_2$, $TaSi_2$ and $WSi_2$) film.

After the patterning has been effected on the first conductive film d1 by the photo-processing, the $N^+$-layer d0 is removed by the same photo-processing operation, with the first conductive film d1 serving as a mask. More specifically, the $N^+$-layer d0 left on the i-layer AS, except for the first conductive film d1, is removed by self-alignment. At this time, the $N^+$layer d0 is etched so that the portion equivalent to its thickness is all removed, and hence the surface of the i-layer AS is also etched to some extent. The extent to which the surface is etched may be controlled according to the etching time.

Subsequently, the second conductive film d2 is formed of aluminum with a thickness of 3000 to 5500 (Å) (approximately 3500 (Å) in this embodiment) by sputtering. The aluminum film is smaller in stress than the chromium film and can be formed thick. The aluminum film behaves to reduce resistance values of the drain electrode SD2 and the image signal line DL. Excepting the aluminum film, the second conductive film d2 may be formed of an aluminum film containing Silicon (Si) and Copper (Cu) as additives.

After the second conductive film d2 has undergone patterning based on the photo-processing thechnique, the third conductive film d3 is composed of a transparent conductive film (ITO: a nesa film) having 1000 to 2000 (Å) (approximately 1200 (Å) in this embodiment) in thickness, which requires the sputtering process. The third conductive film d3 constitutes not only the source electrode SD1, the drain electrode SD2 and image signal line DL but also the transparent pixel electrode ITO1. Each of the first conductive film d1 of the source electrode SD1 and the first conductive film d1 of the drain electrode SD2 extends greatly inward (toward the center of the channel region) compared with the second conductive film d2 and the third conductive film d3. Namely, the first conductive film d1 in these parts is arranged to prescribe the gate length L of the thin film transistor TFT independent of the layers d2, d3.

The source electrode SD1 is, as explained earlier, connected to the transparent pixel electrode ITO1. The source electrode SD1 is formed along the stepped portion (the step equivalent to the thickness obtained by totalizing the thicknesses of the first conductive film g1, the $N^+$-layer d0 and the i-type semiconductor layer AS) of the i-type semiconductor layer AS. More specifically, the source electrode SD1 consists of: the first conductive film d1 formed along the stepped portion of the i-type semiconductor layer AS; the second conductive film d2 so formed thereon as to be smaller on the connecting-side to the transparent pixel electrode ITO1 than the first conductive electrode d1; and the third conductive film d3 which is exposed from the second conductive film d2 and is connected to the first conductive electrode d1. The second conductive film d2 of the source electrode SD1 is formed so as to go over the i-type semiconductor layer As, because the chromium film of the first conductive film d1 cannot be formed thick due to an increase in stress, and is incapable of surmounting the stepped portion of the i-type semiconductor layer AS. That is, the second conductive film d2 is formed thick, and thereby makes a great contribution to a decline in resistance value of the source electrode SD1 (this is the same with the drain electrode SD2 as well as with the image signal line DL). The third conductive film d3 is incapable of surmounting the stepped portion associated with the i-type semiconductor layer AS of the second conductive film d2, and it follows that the third conductive film d3 is arranged to make a connection to the exposed first conductive film d1 by reducing the size of the second conductive film d2. The first and third conductive films d1 and d3 each have a favorable bonding property, and the connecting portion therebetween is small. Hence, these two conductive films can readily be connected to each other.

PIXEL ELECTRODE ITO1

The transparent pixel electrode ITO1 is provided in every pixel and constitutes one of the pixel electrodes of the liquid crystal display unit. The transparent pixel electrode ITO1 is split into three transparent pixel electrodes (divided transparent pixel electrodes) E1, E2 and E3 corresponding to the plurality of divided thin film transistors TFT1 to TFT3, respectively. The transparent pixel electrode E1 is connected to the source electrode SD1 of the thin film transistor TFT1. The transparent pixel electrode E2 is connected to the source electrode SD1 of the thin film transistor TFT2. The transparent pixel electrode E3 is connected to the source electrode SD1 of the thin film transistor TFT3.

The transparent pixel electrodes E1 through E3 are, as in the case of the thin film transistors TFT1 through TFT3, virtually of the same size.

As is obvious from the description given above, the thin film transistor TFT of the pixel disposed in each of the intersection regions TFT of the pixel disposed in each of the intersection regions defined by the two adjacent scanning signal lines GL and the two adjacent image signal lines DL is split into the plurality of thin film transistors TFT1 to TFT3; and the thus divided thin film transistors TFT1 to TFT3 are connected to the plurality of divided transparent pixel electrodes ITO1 to ITO3. Owing to this arrangement, only part (for instance TFT1) of the divided portions of the pixel is subject to a possible point defect, and hence there is no point defect in a large proportion of the pixel (i.e., TFT2 and TFT3 are not associated with the point defect). Consequently, the magnitude of the point defect of the pixel can be reduced on the whole.

Because each of the divided transparent pixels is formed to have virtually the same size, it is feasible to make uniform a liquid crystal capacity (Cpix) provided by a combination of each of the transparent pixel electrodes E1 to E3 and the common transparent pixel electrode ITO2.

PROTECTION FILM PSV1

Protection films PSV1 are provided on the thin film transistor TFT and the transparent pixel electrode ITO1. The protection film PSV1 is formed mainly for protecting the thin film transistor TFT from moisture or the like. The protection film PSV1 should have high transparency and high moisture-resitant properties. The protection film PSV1 is composed of, e.g., silicon nitride film or a silicon oxide film formed by the plasma CVD, in which case the film thickness is approximately 8000 (Å).

LIGHT SHIELDING FILM BM

Figure 6:
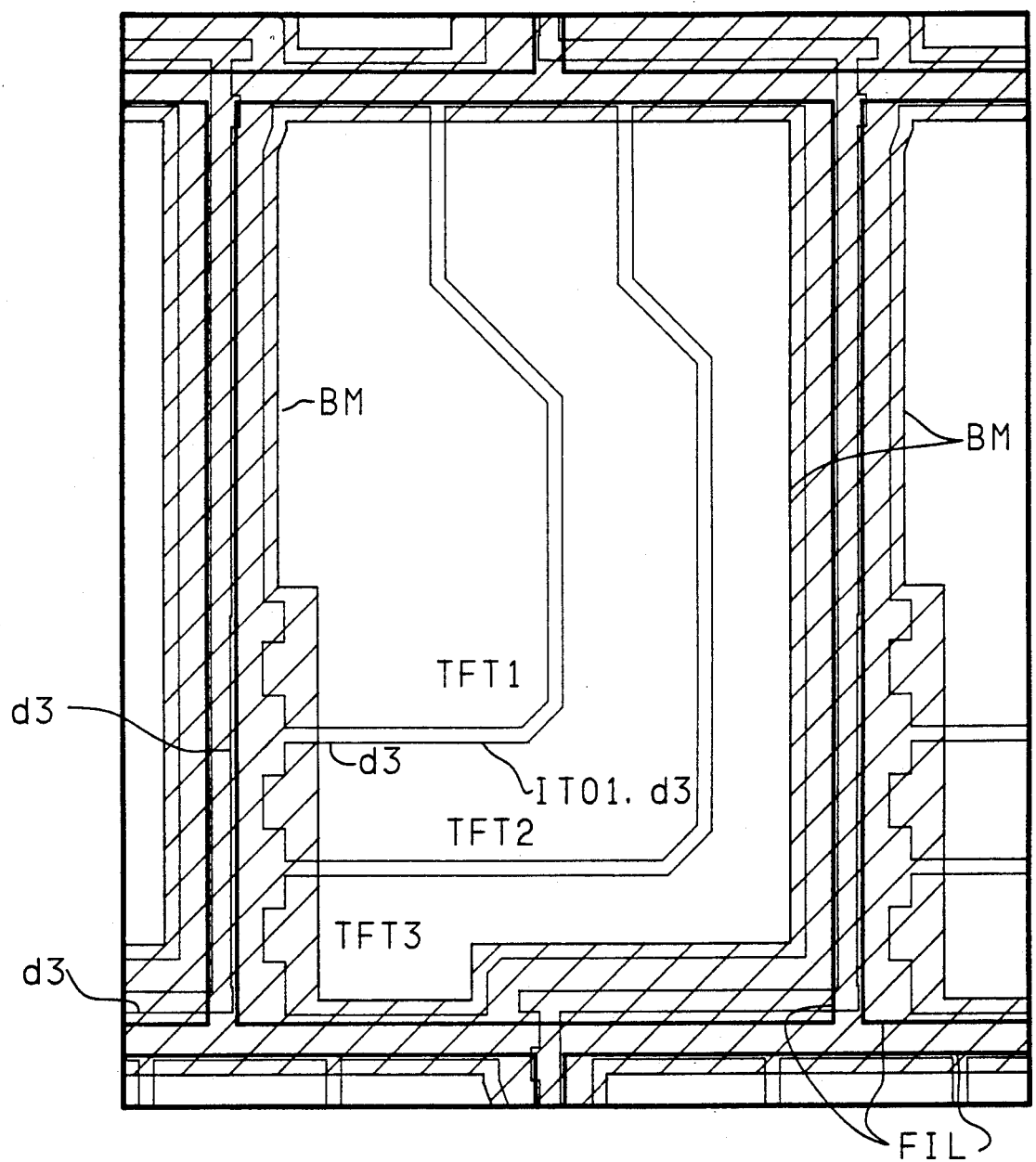

At the upper substrate SUB2, a light shielding film BM is provided and patterned as shown at the hatched portion in FIG. 6 so that the i-type semiconductor layer AS is free from the irradiation of external light (i.e., light from the top in FIG. 2B). Besides FIG. 6 shows a plane view drawing only of the ITO layer d3, filter layer FIL and the light shielding film BM in FIG. 2A.

The light shielding layer BM is formed by materials with a low transparency such as an aluminum or a chromium, and in this embodiment a chromium film with a 1300 (Å) thickness is formed by sputtering.

Accordingly, the semiconductor layer AS common to TFT1 to TFT3 is sandwiched by the upper light shielding film BM and the lower gate electrode GT, and thereby the sandwiched portion is not exposed to the irradiation of the external natural light as well as the backlight. The light shielding film BM is formed at the periphery of the pixel as shown by the hatched portion in FIG. 6. In other words, the light shielding film BM is shaped into a grid pattern (black matrix), and the effective display area of one pixel is defined by the grid. Accordingly, the outline of each pixel is made clear to improve contrast. In other wards, the light shielding film BM has both functions of light shielding for the semiconductor layer AS and light shielding of the so called "black matrix".

Besides, it is possible to attach the backlight at the SUB2 side to arrange the SUB1 positioned at the view side (i.e., the side exposed to outside).

COMMON ELECTRODE ITO2

The common transparent pixel electrode ITO2 stands vis-a-vis the transparent pixel electrode ITO1 provided in every pixel on the side of the lower transparent glass substrate SUB1. The optical state of the liquid crystal changes in response to an electric potential difference (an electric field) between each pixel electrode ITO1 and the common pixel electrode ITO2. This common transparent pixel electrode ITO2 is allowed to undergo impression of a common voltage Vcom. The common voltage Vcom is defined as an intermediate electric potential between a low level driving voltage Vdmin and a high level driving voltage Vdmax which are impressed on the image signal line DL.

COLOR FILTER FIL

Figure 7:
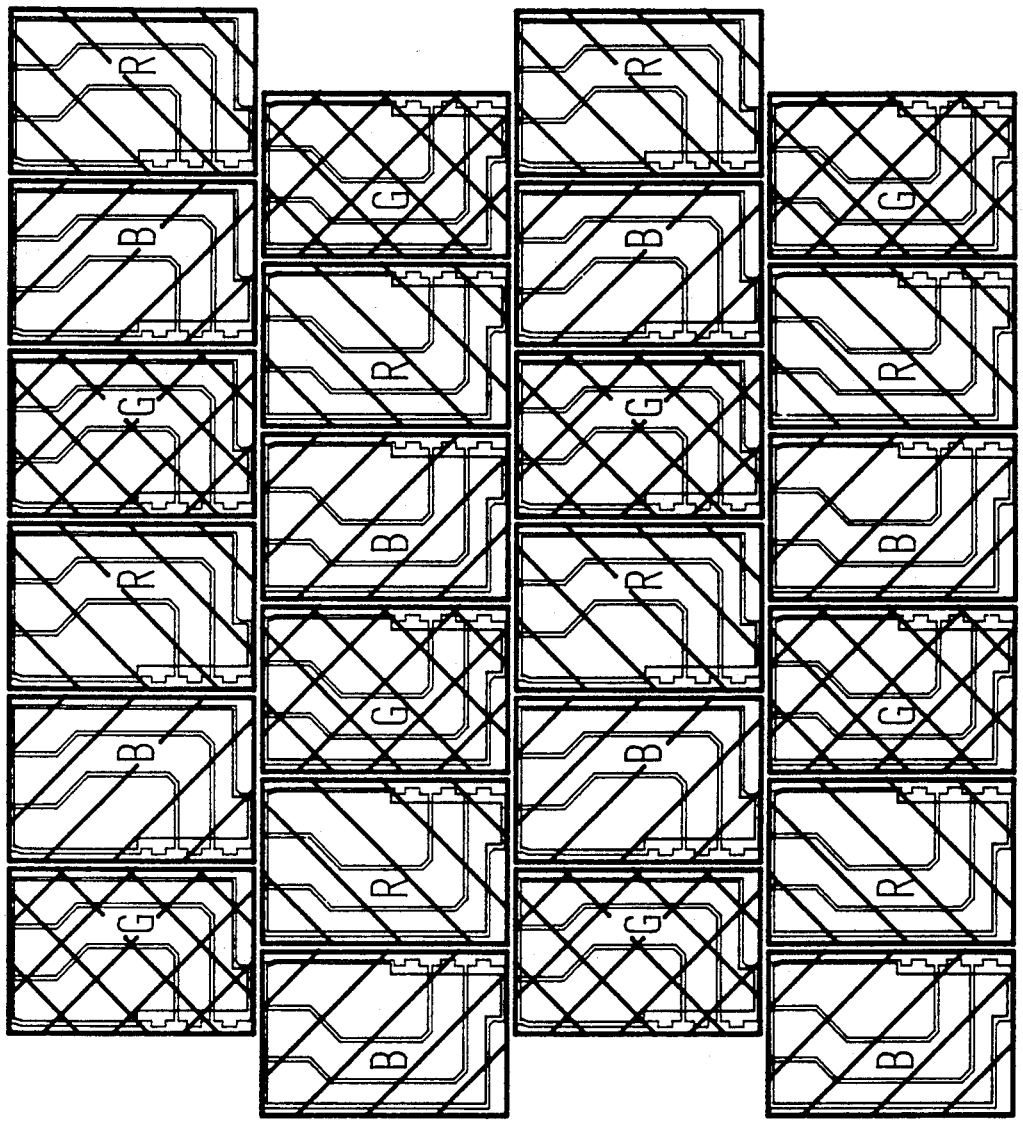
FIG. 7 is a principal plan view showing a state where a pixel electrode layer depicted in FIG. 3 is superposed on a color filter layer.

The color filter FIL is formed in such a manner that a dyeing base member formed of resin, e.g., acrylic resin, is stained with dyestuffs. For every pixel, the color filter FIL is disposed in a dotted shape in a position standing vis-a-vis the pixel (e.g., se FIG. 7). The color filters FIL are allocated according to the dyeing. (FIG. 7 shows only the third conductive film d3 in FIG. 3 and the color filter layer FIL, for each of a red filter R, a blue filter B, a green filter G, wherein a cross-hatch is drawn with a line inclined at an angle of 45°, 135°.) As depicted in FIG. 6, the color filter is formed to be large enough to completely cover the pixel electrode IOT1 (E1~E3), while a light shielding film BM extends inward from four edges of the pixel electrode ITO1 to overlap the edge portion of the color filter FIL and the pixel electrode IOT1.

The color filter FIL may be arranged in the following manner. The arrangement begins with formation of the dyeing base member on the surface of the upper transparent glass substrate SUB2. Excepting a red color filter forming region, the dyeing base member is then partly removed by photolithography. Subsequent to this step, the dyeing base member is stained with a red dyestuff and is subjected to a bonding process, thus forming a red filter R. Next, a green filter G and a blue filter B are sequentially formed by performing the same processes.

The protection film PSV2 is designed for preventing the dyestuffs with which the color filter FIL is differently stained from permeating into the liquid crystal LC. The protection film PSV2 is formed of, for example, transparent resinous material such as acrylic resin, epoxy resin and so on.

PIXEL ARRANGEMENT

Figure 3:
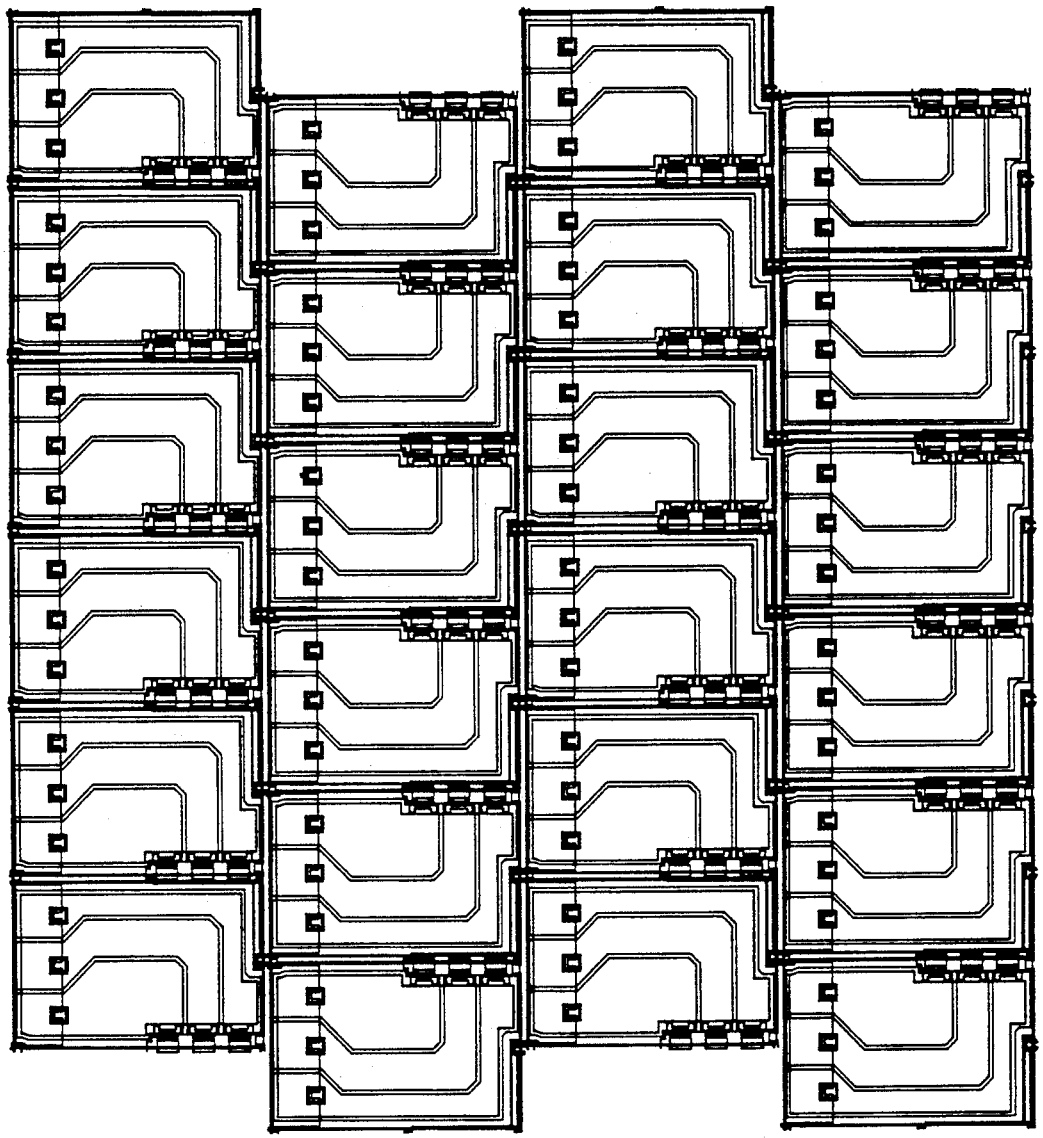
FIG. 3 is a principal plan view illustrating the liquid crystal display unit in which a plurality of pixels shown in FIG. 2A are arrayed.

The plurality of pixels on the liquid crystal display unit are, as depicted in FIG. 3 and 7, arranged in the same row-direction as the direction in which the scanning signal lines GL extend, thus constituting pixel rows $X_1, X_2, X_3, X_4 \ldots$. In each pixel of the pixel rows $X_1, X_2, X_3, X_4 \ldots$, the positions in which the thin film transistors TFT1 to TFT3 and the transparent pixel electrodes E1 to E3 are disposed are the same. To be more specific, in each pixel of the pixel rows $X_1, X_3 \ldots$, the positions in which the thin film transistors TFT1 through TFT3 are disposed are set to the left, whereas the positions in which the transparent pixel electrodes E1 through E3 are disposed are set to the right. The individual pixels of the pixel rows $X_2, X_4 \ldots$, that are positioned at the stage subsequent to the pixel rows $X_1, X_3 \ldots$ in the column-direction and the pixel of the pixel rows $X_1, X_3 \ldots$ each exhibit a linear symmetry with respect to image signal line DL. In each pixel of the pixel rows $X_2, X_4 \ldots$, the thin film transistors TFT1 to TFT3 are disposed on the right side, whereas the transparent pixel electrodes E1 to E3 are disposed on the left side. The pixels of the picture element rows $X_2, X_4 \ldots$ are each placed to shift (deviate) a distance equivalent to half of a pixel in the row-direction with respect to the pixels of the pixel rows $X_1, X_3 \ldots$. Supposing that the intervals between the pixels of the pixel row X are all set to 1.0 (1.0 pitch), the pixel interval is 1.0 in the next pixel row X, and hence the pixels deviate from those of the previous pixel row X with a 0.5 pixel interval (0.5 pitch) in the row-direction. Each of the image signal lines DL disposed between the pixels in the column-direction extends a distance equivalent to half of a pixel in the row-direction between the pixel columns.

As illustrated in FIG. 7, it is therefore possible to provide a 1.5 pixel interval (1.5 pitch) between each of the pixels of the previous pixel row X in which predetermined color filters are formed (for instance, the pixels of the pixel row $X_3$ in which the red filters are formed) and each of the pixels of the next pixel row X in which the same color filters are formed (for example, the pixels of the pixel row $X_4$ in which the red filters are formed). The color filter FIL is allowed to take a triangular arrangement of RGB. This triangular arrangement of RGB of the color filter FIL is capable of enhancing conditions under which the respective colors are mixed. Hence, a resolution of color image can be improved.

Between the pixel rows X, the image signal line DL extends a distance which is half of a pixel in the row-direction, whereby this image signal line DL does not intersect the adjacent image signal line DL. This eliminates the necessity of leading around the image signal line DL, resulting in a decrease in the occupied area thereof. It is therefore feasible to eliminate both a detour of the image signal line DL and the multilayered wiring structure.

EQUIVALENT CIRCUIT OF A DISPLAY PANEL

Figure 8:
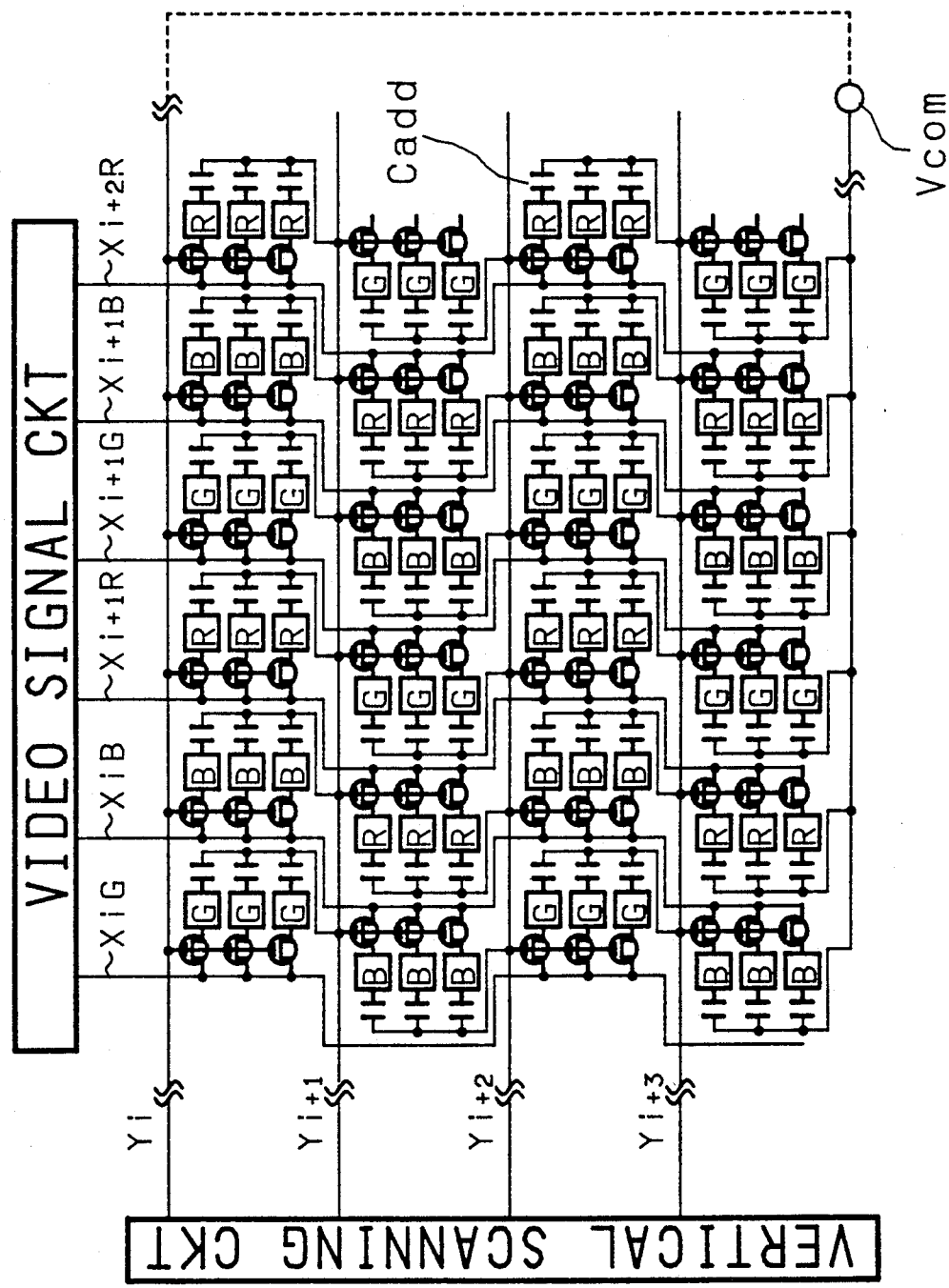
FIG. 8 is a diagram illustrating an equivalent circuit in the liquid crystal display unit of the active matrix color liquid crystal display device.

Directing attention to FIG. 8 (an equivalent circuit diagram of the liquid crystal display unit), there is illustrated a construction of a circuit of the liquid crystal display. In FIG. 8, the symbols XiG, Xi+1G, . . . indicate the image signal lines DL connected to the pixels in which green filters G are formed. The symbols XiB, Xi+1B, . . . represent the image signal lines DL connected to the pixels in which the blue filters B are formed. The symbols Xi+1R, Xi+2R, . . . denoted the image signal lines DL connected to the pixels in which the red filters R are formed. These image signal lines DL are selected by a image signal driving circuit. The symbol Yi denotes the scanning signal line GL for selecting the pixel row $X_1$ depicted in FIGS. 3 and 7. Similarly, the symbols Yi+1, Yi+2, . . . indicated the scanning signal lines GL for selecting the pixel rows $X_2$, $X_3$, . . . These scanning signal lines GL are connected to a vertical scanning circuit.

STRACTURE OF A HOLDING CAPACITY Cadd

Each on the transparent pixel electrodes E1 to E3 is superposed on the scanning signal line GL of the next stage in the column-direction both on the side connected to the thin film transistor TFT and on the side opposite thereto, and is formed in an L-like shape. By virtue of the above-described superposition, a holding capacity element (an electrostatic capacity element) Cadd is formed wherein each of the transparent pixel electrodes E1 to E3 is employed as one electrode PL2, and the scanning signal line GL of the next stage in employed as the other electrode PL1. A dielectric film of the holding capacity element Cadd is formec of the same layer as that of the insulating film used as a gate insulating film of the thin film transistor TFT.

As depicted in FIG. 4, the holding capacity is formed in a portion where the width of the first film g1 of the gate line GL is broadened. Also, the portion of the first film g1 crossing the drain line DL is narrowed to decrease the possibility of shorting the drain line.

Formed between each of the transparent pixel electrodes E1 to E3 which are superposed to constitute the holding capacity electrode line (g1) is an insular region composed of the first conductive film d1 and the second conductive film d2 as in the case of the source electrodes SD1, with the result that the transparent pixel electrode IT01 is not disconnected when surmounting the stepped portion. This insular region is shaped as small as possible so as not to diminish the area (opening rate) of the transparent pixel electrode IT01.

EQUIVALENT CIRCUIT OF A HOLDING CAPACITY Cadd AND ITS OPERATION

Figure 9:
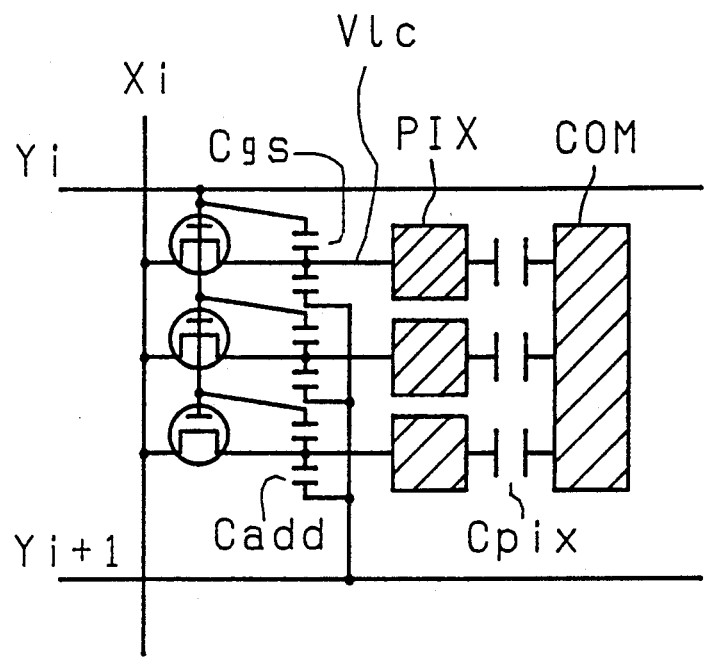
FIG. 9 is a diagram showing an equivalent circuit of the pixel illustrated in FIG. 2A.

Referring to FIG. 9, there is depicted an equivalent circuit of pixel shown in FIG. 2A. In FIG. 9, the symbol Cgx represnets the amount of superposition associated with the source electrode SD1 and the gate electrode GT of the thin film transistor TFT. The dielectric film of the superposition quantity Cgs is defined as the insulating film GI. The symbol Cpix designates a liquid crystal capacity provided between the transparent pixel electrode IT01 (PIX) and the common transparent pixel electrode IT02 (COM). The dielectric film of the liquid crystal capacity Cpix includes the liquid crystal LC, the protection film PSV1 and the orientation films OR11 and OR12. The symbol Vlc denotes a mid-point potential.

The holding capacity element Cadd behaves to reduce the influence of a gate potential variation $\Delta Vg$ on the mid-point potential (a pixel electrode potential) Vlc. This will be expressed by the following formula:

$$\Delta Vlc = (Cgs/(Cgs + Cadd + Cpix))$$

X $\Delta Vg$, where $\Delta Vlc$ is the amount of variation in the mid-point potential due to $\Delta Vg$. This variation quantity ΔVlc is the cause of the DC component applied to the liquid crystal. A value of the variation quantity can be reduced in accordance with the degree to which the holding capacity Cadd is increased. The holding capacity Cadd also has a function of increasing the time of electric discharge, whereby the image information after turning OFF the thin film transistor remains accumulated for a long period of time. The reduction in the DC component applied to the liquid crystal LC permits both improvement of life span of the liquid crystal LC and diminution in so-called seizing wherein the preceding image still subsists when changing over the liquid crystal display picture.

As discussed in the previous case, the gate electrode GT is large enough to completely cover the semiconductor layer AS, and the area of overlap of the source electrode SD1 with the drain electrode SD2 increases correspondingly. Hence, a reverse effect is yielded wherein the parasitic capacity Cgs augments, and the mid-point potential Vlc tends to receive the influence of the gate (scanning) signal Vg. This demerit can, however, be obviated by providing the holding capacity Cadd.

The holding capacity of the holding capacity element Cadd is set to a value which is 4 to 8 times the liquid crystal capacity Cpix (4. Cpix < Cadd < 8. Cpix) and 8 to 32 times the superposition capacity Cgs (8. Cgs < Cadd < 32. Cgs).

WAY OF CONNECTION OF A CAPACITY ELECTRODE LINE Cadd

The scanning signal line GL of the final stage (or the scanning signal line of the first stage) used as a capacity electrode line is, as depicted in FIG. 8, connected to the common transparent pixel electrode (Vcom) IT02. The common transparent pixel electrode IT02 is, as illustrated in FIG. 2B, connected to the outside extension wire through the silver paste material SL on the fringe of the liquid crystal display device. Besides, some conductive layers (g1 and g2) of the outside extension wire are formed in the same manufacturing process as that of the scanning signal line GL. As a result, this facilitates a connection between the scanning signal line GL (capacity electrode line) of the final stage and the common transparent pixel electrode IT02.

The dotted line in FIG. 8 represents the connecting of the capacity electrode line GL of the final stage (the first stage) to the scanning signal line of the first stage (the final stage). The scanning signal line of the first stage is connected to the capacity electrode line of the final stage through an inside wire in the liquid crystal display unit or through an outside extension wire.

DC CANCEL SYSTEM BY A HOLDING CAPACITY Cadd SCANNING SIGNAL

Figure 10:
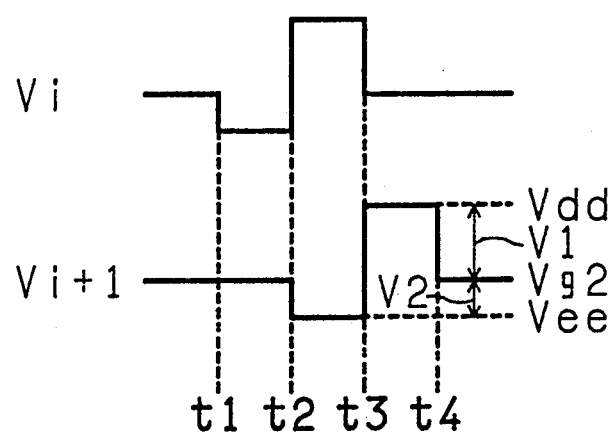
FIG. 10 is a time chart showing a driving voltage of a scanning signal line based on a DC offset system.

Based on the DC offset system (DC cancel system) disposed in Japanese Patent Publication No. 95125/1987 for which the present inventors applied, the liquid crystal display device is capable of reducing the DC component applied to the liquid crystal LC, as shown in FIG. 10 (a time chart), by controlling the driving voltage of the scanning signal line DL. Referring to FIG. 10, the symbol Vi represents a driving voltage of an arbitrary scanning signal line GL, and Vi+1 designates a driving voltage of the scanning signal line GL of the next stage. The symbol Vee indicates a driving voltage Vdmin assuming low level which is impressed on the scanning signal line GL, and Vdd indicates a driving voltage Vdmax assuming high level which is impressed on the scanning signal line GL. Voltage variation quantities $V_1$ to $V_4$ of the mid-point potential (see FIG. 9) at the respective timings $t = t_1$ to $t_4$ are given such as:

$$t=t_1: \Delta V_1 = -(Cgs/C) \cdot V_2$$

$$t=t_2: \Delta V_2 = +(Cgs/C) \cdot (V_1+V_2) - (Cadd/C) \cdot V_2$$

$$t=t_3: \Delta V_3 = -(Cgs/C) \cdot (V_1+Cadd/C) \cdot (V_1+V_2)$$

$$t=t_4: \Delta V_4 = -(Cadd/C) \cdot V_1$$

However, a total pixel capacity is: $C = Cgs + Cpix + Cadd$.

If a sufficient driving voltage impressed on the scanning signal line GL is provided (see "Notes" given below), the DC voltage applied to the liquid crystal LC is expressed such as:

$$\Delta V_3 + V_4 = (Cadd \cdot V_2 - Cgs \cdot V_1)/C,$$

hence, $$Cadd \cdot V_2 = Cgs \cdot V_1 = 0$$

Then, the DC voltage applied to the liquid crystal LC comes to zero. "Notes": A variation quantity of a scanning line Vi exerts an influence on the mid-point potential Vlc at the timings $t_1$ and $T_2$. However, the mid-point potential Vlc becomes equal to the image signal potential through a signal line Xi during a period of $t_2$ to $t_3$ (sufficient for writing of the image signal). The potential applied to the liquid crystal is substantially contingent upon a potential immediately after turning OFF the thin film transistor TFT (a TFT OFF-period is sufficiently longer than a TFT ON-period). Therefore, when calculating the DC component applied to the liquid crystal, a period of $t_1$ to $t_3$ may be almost ignored, and what should be considered here is the potential just after the thin film transistor TFT has been turned OFF, i.e., the influence produced at the transistion between the timings $t_3$ and $t_4$. It is to be noted that the polarity of the image signal Vi is inverted per frame or per line, and the DC component associated with the image signal itself is zero. Based on the DC offset system, an amount of decrease caused by the lead-in of the mid-point potential Vlc due to the superposition capacity Cgs is made to rise by the driving voltage impressed on the scanning signal line GL (capacity electrode line) of the next stage as well as on the holding capacity element Cadd, and the DC component applied to the liquid crystal LC can be minimized. This permits the liquid crystal display device to improve the life span of the liquid crystal LC. As a matter of course, where the gate GT increases in configuration to enhance the light shielding effects, a value of the holding capacity Cadd may be incremented correspondingly.

Figure 1B:
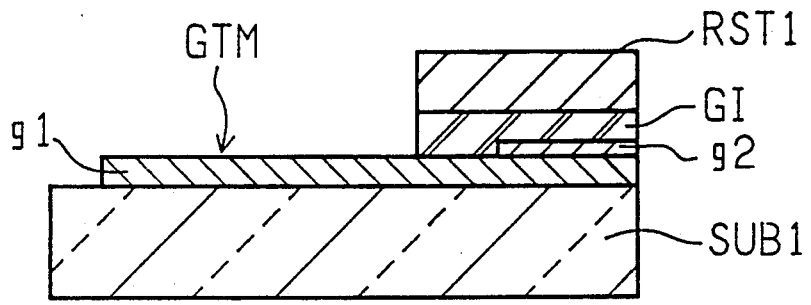
Figure 1C:
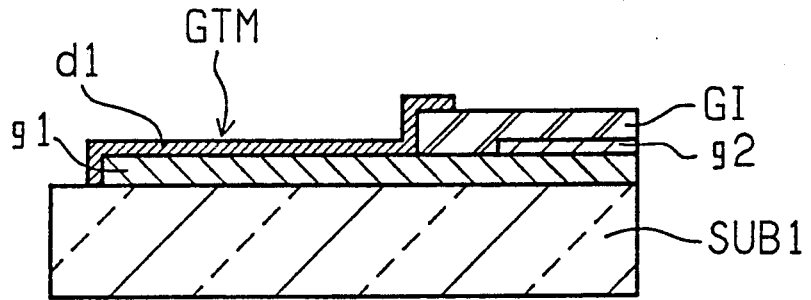
Figure 1D:
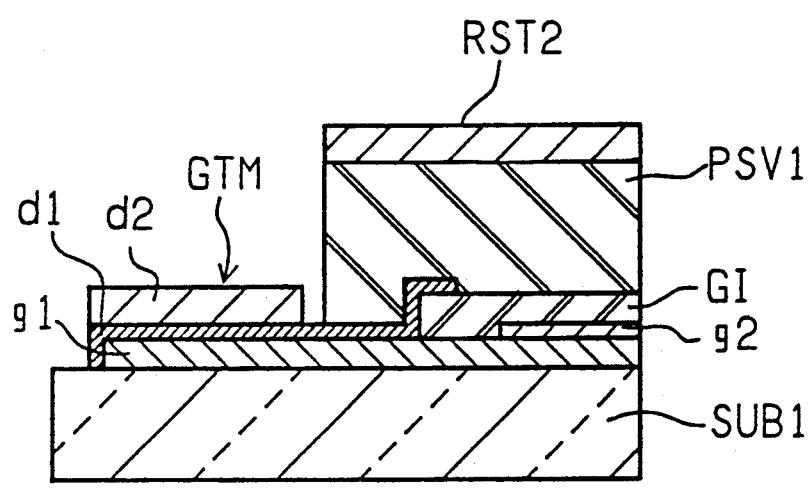
Figure 1E:
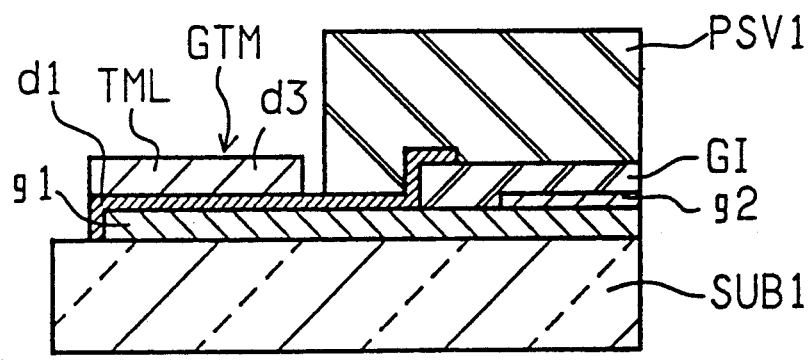
Figure 11A:
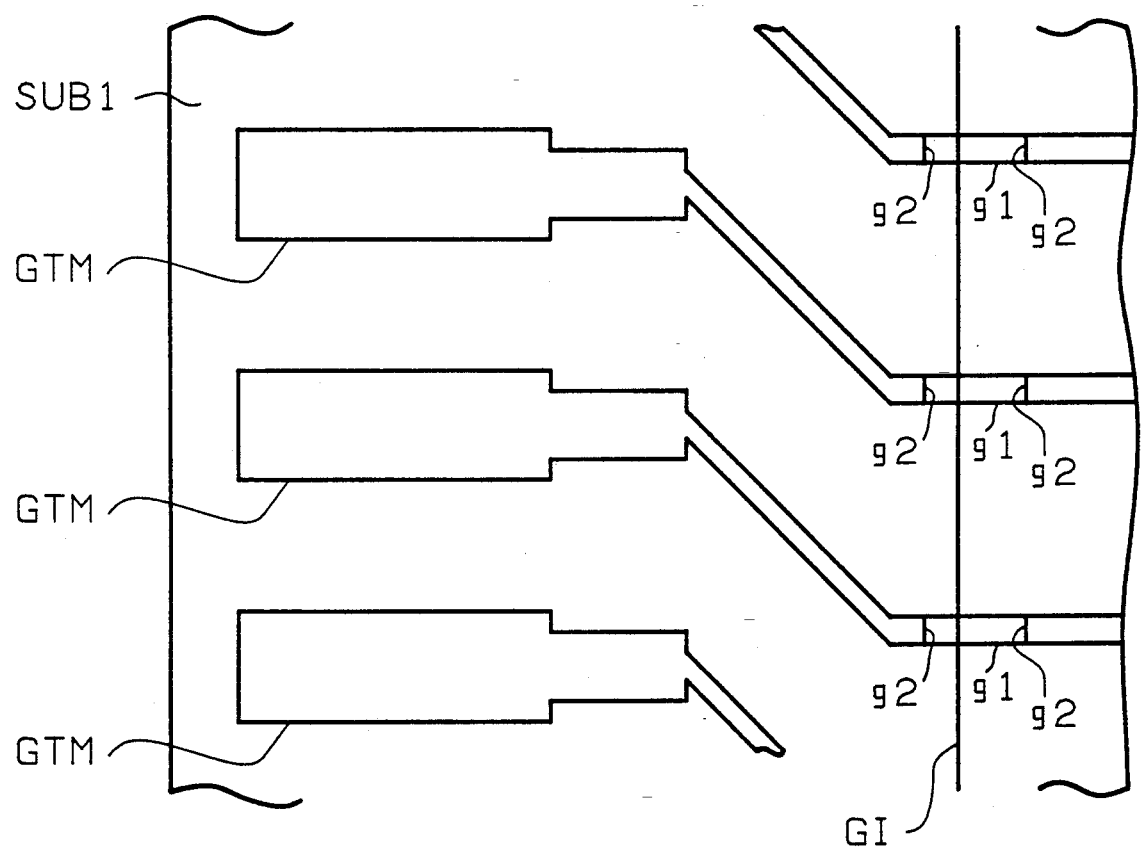
FIGS. 11 and 12 are plan views for assistance in explaining some of the predetermined steps of the method, shown in FIG. 1, of manufacturing the liquid crystal display device.
Figure 12A:
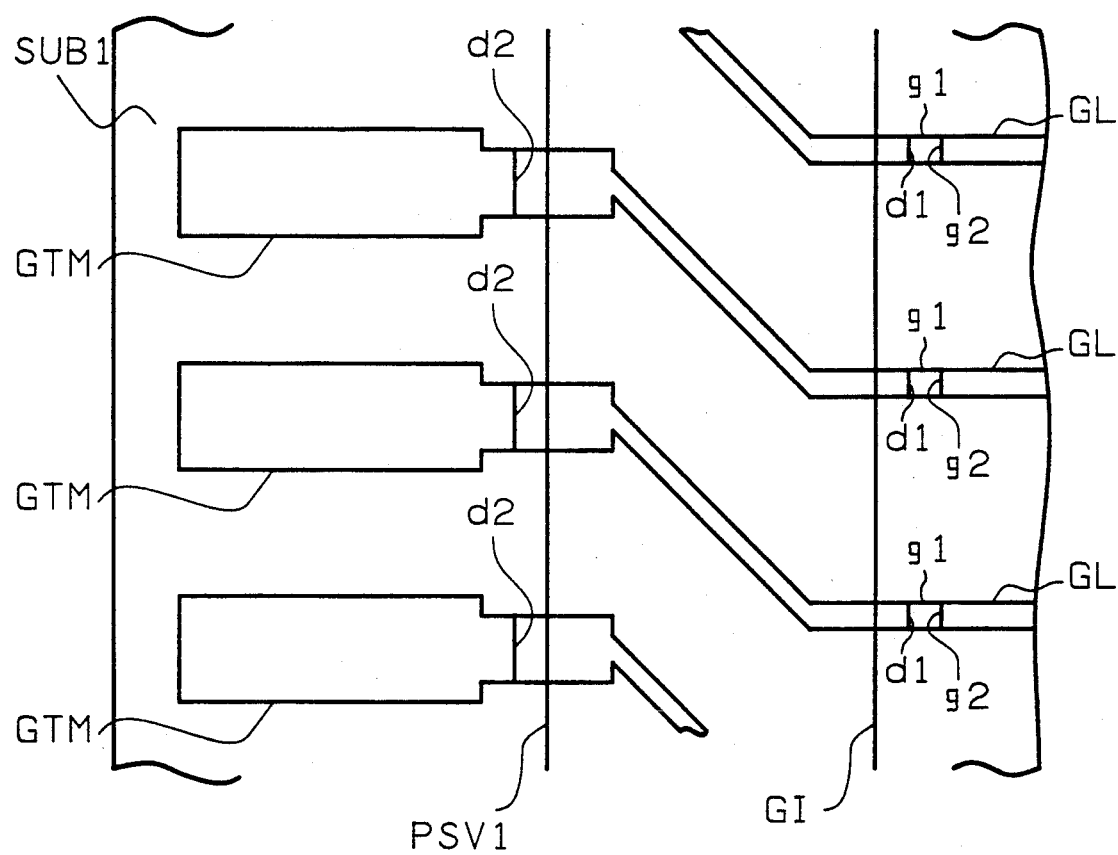

A method of manufacturing the active matrix color liquid crystal display device according to the present invention will hereinafter be described with reference to FIG. 1. To start with, as depicted in FIG. 1(a), a first conductive film g1 composed of chromium having a thickness of 1100 [Å] is formed by sputtering on a lower transparent glass substrate SUB1 made of 7059 glass (a brand name). Subsequent to this step, the first conductive film g1 is selectively etched by photoetching which involves the use of a dibasic cerium ammonium nitrate solution as an etching liquid, thereby forming a first layer of a scanning signal line GL, a gate electrode GT, an electrode PL1 of a holding capacity element Cadd, a discharge pattern (in which protrusions are formed both on a portion used to batch-connect a gate terminal GTM and on a portion used to batch-connect a drain terminal), substrate numbers and a TEG pattern. At the same moment, a first layer of the gate terminal GTM is formed. Next, a resist is removed by use of a peeling liquid S502 (a brand name), and thereafter an ashing process of $O_2$ is effected for one minute. The next step is to provide a second conductive film g2 composed of a aluminum-paladium, aluminum-silicon, aluminum-silicon-titanium or aluminum-silicon-copper to have a thickness of 1000 [Å] by sputtering. Subsequently, the second conductive film g2 is selectively etched by photoetching which involves the use of a mixture of phosphoric acid, nitric acid and acetic acid as an etching liquid, thus forming a second layer of the scanning signal line GL and simultaneously disposing the second conductive film g2 on the first conductive film g1 of the gate terminal GTM. In this case, as depicted in FIG. 11A, an end of the second conductive film g2 on the first conductive film g1 of the gate terminal GTM is positioned approximately 10 [[m]] away from an end of an insulating film GI. An $SF_6$ gas is introduced into a dry etching unit, and the resist is eliminated after removing a residue of silicon. An ammonia gas, a silane gas and a nitrogen gas are introduced into a plasma CVD device to form a nitride silicon film having a thickness of 3500 [Å]. Thereafter, the silane gas, a hydrogen gas and a phosphine gas are introduced into the plasma CVD device to form an i-type amorphous silicon film having a thickness of 2100 [Å] and an $N^+$-type silicon film having a thickness of 300 [Å]. In the wake of this process, the $N^+$-type silicon film and the i-type amorphous silicon film are selectively etched by photoetching which employs $SF_6$ and $CCl_4$ as a dry etching gas, thereby forming an i-type semiconductor layer AS. After removing the resist, a resist RST1 is provided, and the nitride silicon film is selectively etched by use of $SF_6$ as a dry etching gas, with the result that an insulating film GI is formed. Before eliminating the resist RST1, as illustrated in FIG. 1(b), the second conductive film g2 disposed on the first conductive film g1 of the gate terminal GTM is removed by using a developer NMD (a brand name) and a mixture of the phosphoric acid, the nitric acid and the acetic acid. After eliminating the resist RST1, as illustrated in FIG. 1(c), a first conductive film d1 of chromium having a thickness of 600 [Å] is formed by sputtering. Then, the first conductive film d1 is selectively etched by photoetching, thereby forming a first layer of an image signal line DL, a source electrode SD1 and a drain electrode SD2 and also a second layer of the gate terminal GTM. In this case, a width of the first conductive film d1 is set larger than that of the first conductive film g1, and at the same time, as depicted in FIG. 12A, an end of the first conductive film d1 on the first conductive film g1 of the gate terminal GTM is arranged to run on the insulating film GI. Subsequently, before removing the resist, $CCl_4$ and $SF_6$ are introduced into the dry etching unit, and the $N^+$-type silicon film is selectively etched, thus forming an $N^+$-type semiconductor layer d0. After eliminating the resist, ashing of $O_2$ is effected for one minute. Next, as shown in FIG. 1(d), a second conductive film d2 made of aluminum-paladium, aluminum-silicon, aluminum-silicon-titanium or aluminum-silicon-copper is formed up to 3500 [Å] by sputtering. The second conductive film d2 is selectively etched by photoetching, thereby forming a second layer of the image signal line DL, the source electrode SD1 and the drain electrode SD2 and also providing the second conductive film d2 on the first conductive film d1 of the gate terminal GTM. In this case, as illustrated in FIG. 12A, the end of the second conductive film d2 disposed on the first conductive film d1 which constitutes the second layer of the gate terminal GTM is positioned outwardly of an end of a protect film PSV1. After removing the resist, the ashing process of $O_2$ is carried out for one minute. A third conductive film d3 formed of an ITO film having a thickness of 1200 [Å] is provided by sputtering. The third conductive film d3 is selectively etched by photoetching which involves the use of a mixture of hydrochloric acid and nitric acid as an etching liquid, thereby forming a third layer of the image signal line DL, the source electrode SD1 and the drain electrode SD2 and also a transparent pixel electrode ITO1. The resist is eliminated, and thereafter an ammonia gas, a silane gas and a nitrogen gas are introduced into the plasma CVD device, whereby a nitride silicon film that is 1 [μm] thick is formed. Next, a resist RST2 is shaped, and the nitride silicon film is selectively etched by use of $SF_6$ as a dry etching gas, thus forming a protect film PSV1. As depicted in FIG. 1(e), before removing the resist RST2, the second conductive film d2 on the first conductive film d1 of the gate terminal GTM is removed by using the developer NMD and the mixture of phosphoric acid, nitric acid and acetic acid. Subsequently, an ITO film with a thickness of 1200 [Å] is formed by sputtering. Then, the ITO film is selectively etched by photoetching which involves the use of the mixture of hydrochloric acid and nitric acid as an etching liquid to thereby form a topmost layer TML of the gate terminal GTM.

In the method of manufacturing the liquid crystal display device, the second conductive film g2 is used to constitute the second layer of the scanning signal line GL, and, at the same time, the second conductive film g2 is also disposed on the first conductive film g1 which is to shape the first layer of the gate terminal GTM. Then, the insulating film GI is formed, and thereafter the second conductive film g2 on the first conductive film g1 of the gate terminal GTM is removed. As a result, the surface of the first conductive film g1 of the gate terminal GTM is not contaminated, and it is therefore possible to prevent the deterioration of contact between the first conductive film g1 of the gate terminal GTM and the first conductive film d1. Besides, the second conductive film d2 which is to shape the second layer of the image signal line DL is formed, and is simultaneously disposed on the first conductive film d1 constituting the second layer of the gate terminal GTM. After the protect film PSV1 has been shaped, the second conductive film d2 provided on the second layer of the gate terminal GTM is eliminated. As a result, there is practically no probability that the surface of the first conductive film d1 which shapes the second layer of the gate terminal GTM will be contaminated. This, in turn, prevents the deterioration of contact between the first conductive film d1 of the gate terminal GTM and the topmost layer TML. A resistance of the gate terminal GTM can thus be reduced.

Figure 13A:
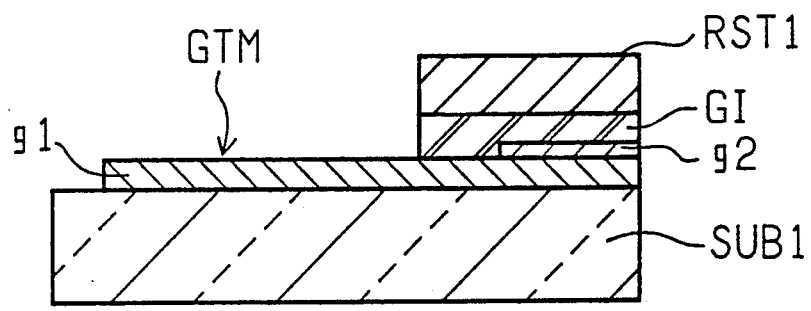
Figure 13B:
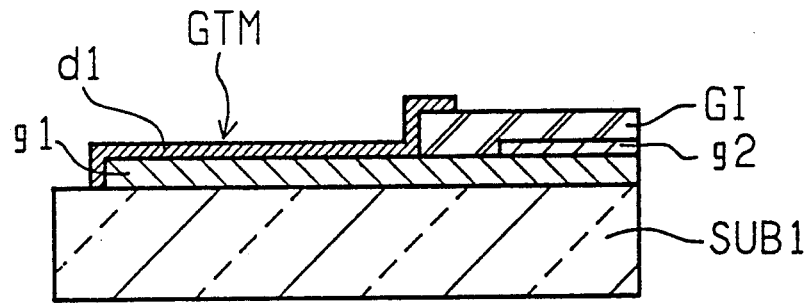
Figure 13C:
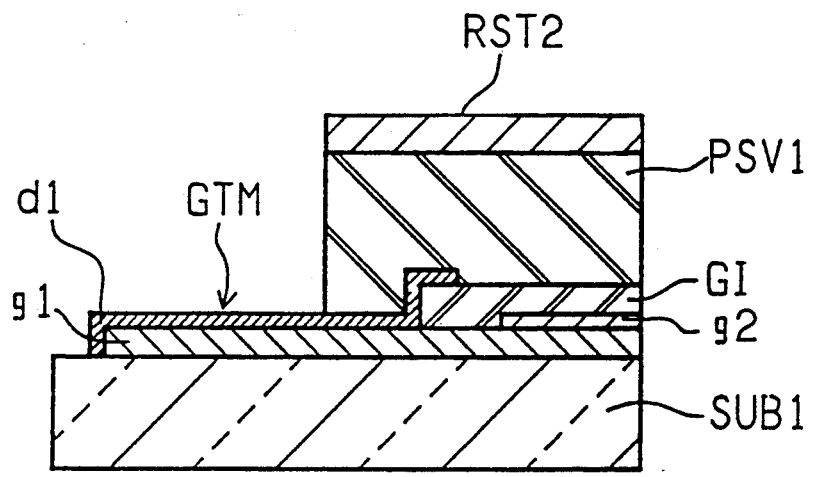
Figure 13D:
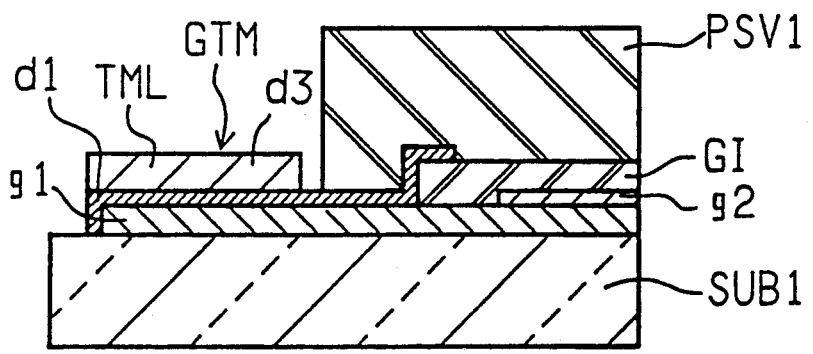
Figure 13J:
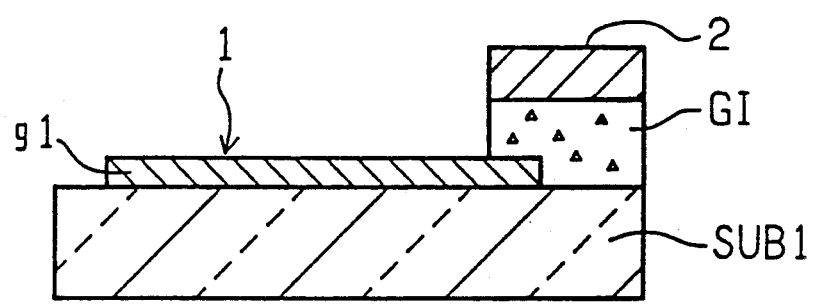
Figure 13K:
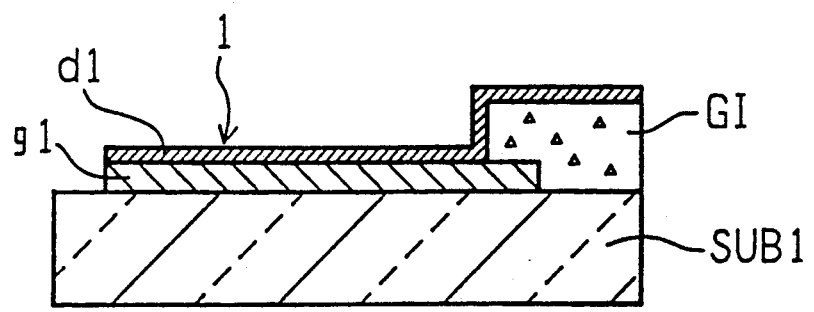
Figure 13:
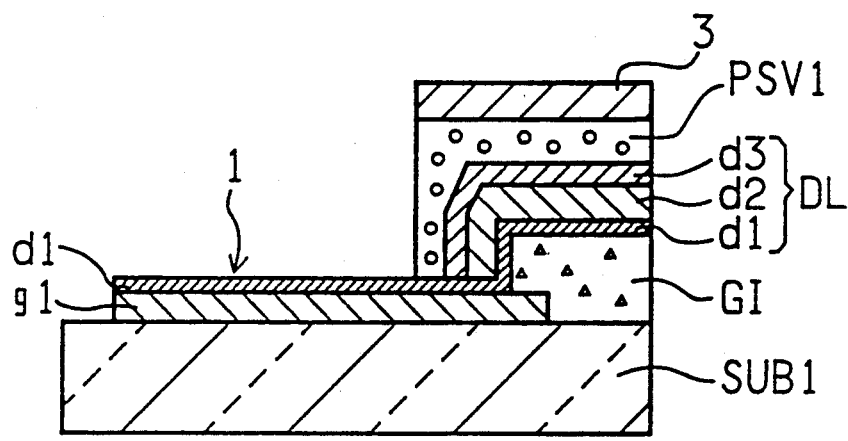

Another method of manufacturing the active matrix color liquid crystal display device according to the present invention will be explained with reference to FIG. 13. To begin with, as illustrated in FIG. 13(a), first conductive film g1 is provided on the lower transparent glass substrate SUB1 by sputtering. Next, the first conductive film g1 is selectively etched for forming a first layer of the scanning signal line GL, a gate electrode GT and an electrode PL1 of the holding capacity element Cadd. Concurrently, a first layer of the gate terminal GTM is formed. Subsequent to this step, a second conductive film g2 is formed by sputtering. Then, the second conductive g2 is selectively etched, thereby shaping a second layer of the scanning signal line GL. The resist is removed, and, after providing a nitride silicon film, an i-type amorphous silicon film and an N+-type silicon film are formed. In the wake of this step, the N+-type silicon film and the i-type amorphous silicon film are selectively etched preparatory to formation of an i-type semiconductor layer AS. After eliminating the resist, a resist RST1 is provided, and the nitride silicon film undergoes selective etching to form an insulating film GI. In the second place, before removing the resist RST1, the surface of the first conductive film g1 of the gate terminal GTM is treated by use of a mixture of hydrochloric acid and nitric acid. Next, as depicted in FIG. 13(b), after removing the resist RST1, a first conductive film d1 is shaped by sputtering. The first conductive film d1 selectively etched to form a first layer of the image signal line DL, the source electrode SD1 and the drain electrode SD2 and also a second layer of the gate terminal GTM. Subsequently, before eliminating the resist, an N+-type silicon film undergoes selective etching, thereby providing an N+-type semiconductor layer d0. After eliminating the resist, as depicted in FIG. 13(c), a second conductive film d2 is formed by sputtering. The second conductive film d2 is selectively etched to provide a second layer of the image signal line D1, the source electrode SD1 and the drain electrode SD2. Subsequent to this step, after removing the resist, a third conductive film d3 is shaped by sputtering. The third conductive film d3 is subjected to selective etching for providing a third layer of the image signal line DL, the source electrode SD1 and the drain electrode SD" and also a transparent pixel electrode ITO1. A nitride silicon film is formed after eliminating the resist. Then, a resist RST2 is provided, and the nitride silicon film is selectively etched, thereby forming a protect film PSV1. Next, before removing the resist RST2, a surface treatment is effected on the first conductive film d1 constituting the second layer of the gate terminal GTM by using a mixture of hydrochloric acid and nitric acid. As shown in FIG. 13(d), the resist RST2 is removed, and thereafter an ITO film is formed on the basis of the sputtering process. The ITO film is selectively etched to form a topmost layer TML of the gate terminal GTM.

Based on this method of manufacturing the liquid crystal display device, after the insulating film GI has been shaped, the surface treatment is performed on the first conductive film g1 constituting the first layer of the gate terminal GTM, which involves the use of the mixture of hydrochloric acid and nitric acid. It is therefore possible to purge the surface of the first conductive film g1 which shapes the first layer of the gate terminal GTM. This, in turn, prevents the deterioration of contact between the first conductive film d1 and the first conductive film g1 of the gate terminal GTM. After forming the protect film PSV1, a surface treatment of the first conductive film d1 serving as the second layer of the gate terminal GTM by use of the mixture of hydrochloric acid and nitric acid is carried out so that it is possible to cleanse the surface of the first conductive film d1 constituting the second layer of the gate terminal GTM. Hence, it is feasible to prevent the deterioration of contact between the first conductive film d1 of the gate terminal GTM and the topmost layer TML, whereby the resistance of the gate terminal GTM can be reduced.

Figure 1J:
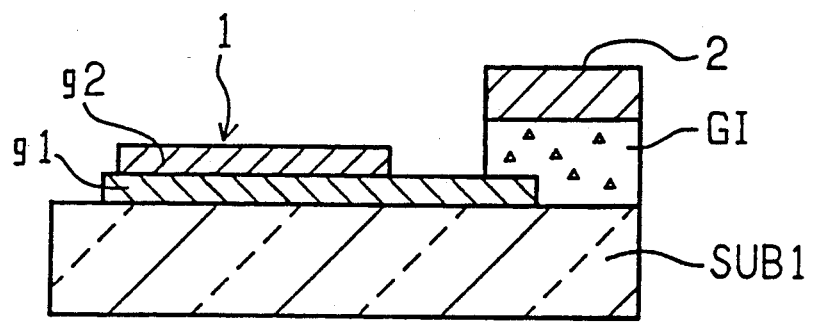
FIGS. 1(j) to 1(n) are diagrams showing a variation.
Figure 1K:
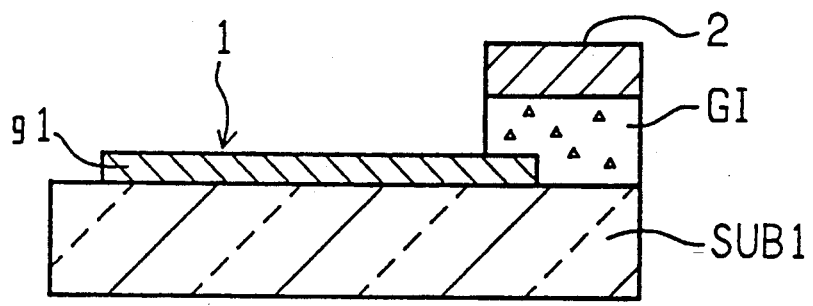
Figure 1L:
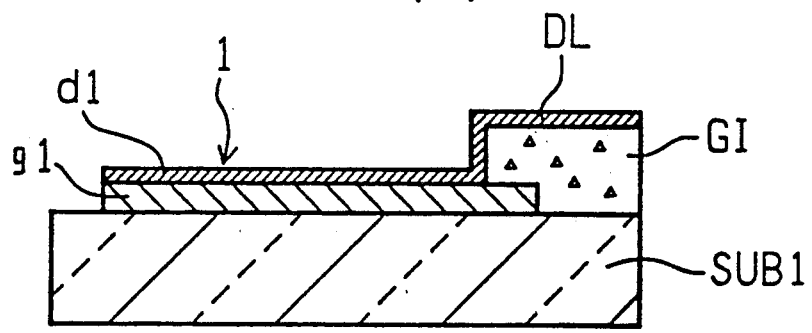
Figure 1M:
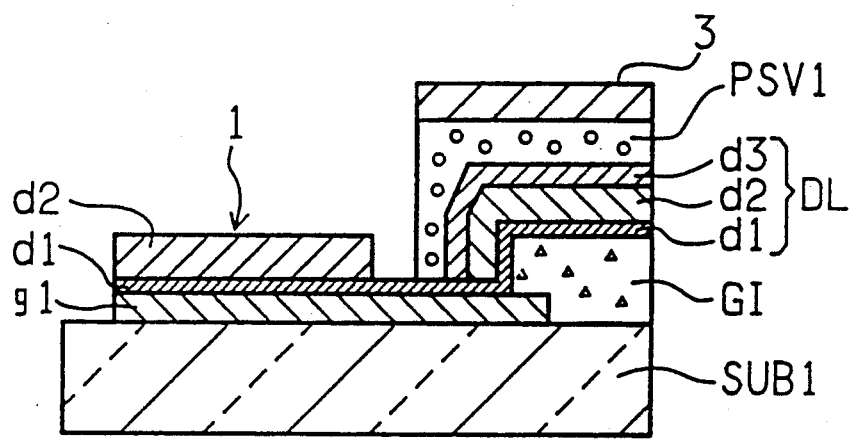
Figure 1N:
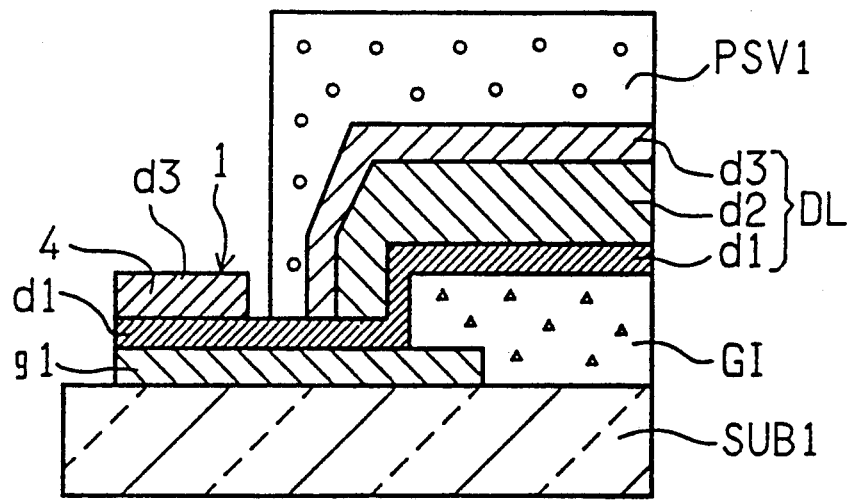
Figure 11B:
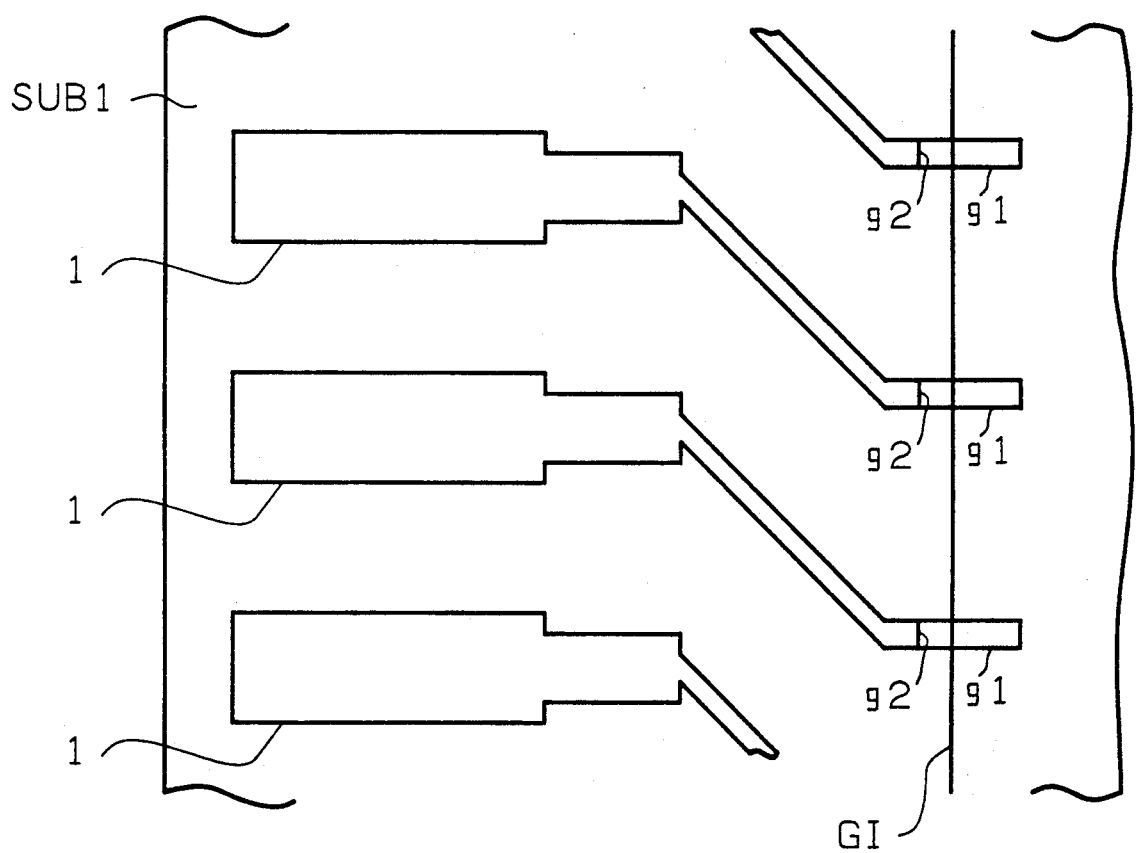
Figure 12B:
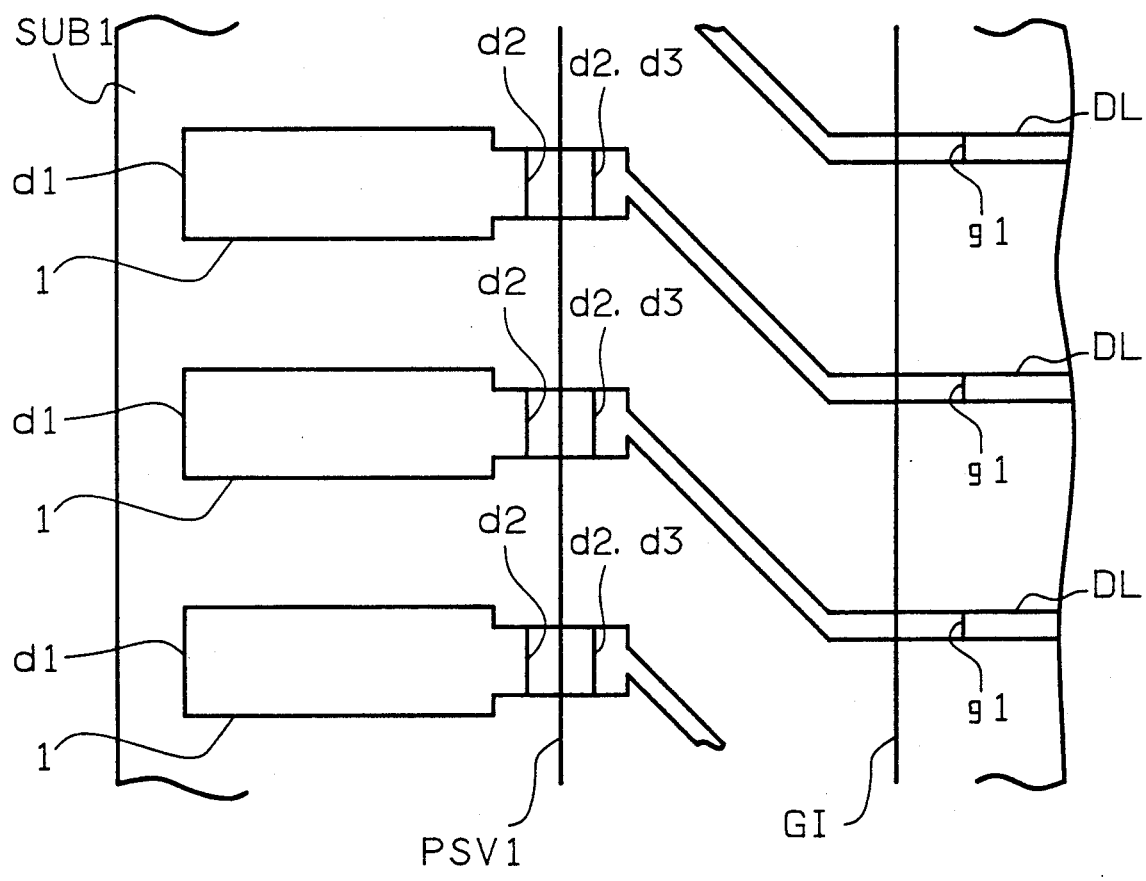

A further method of manufacturing the active matrix color liquid crystal display device according to the present invention will hereinafter be described with reference to FIG. 1. To start with, as depicted in FIG. 1(j), a first conductive film g1 composed of chromium having a thickness of 1100 [Å] is formed by sputtering on a lower transparent glass substrate SUB1 made of 7059 glass (the brand name). Subsequent to this step, the first conductive film g1 is selectively etched by photoetching which involves the use of the dibasic cerium ammonium nitrate solution as an etching liquid, thereby forming a first layer of a scanning signal line GL, a gate electrode GT and an electrode of a holding capacity element Cadd. Simultaneously, a first layer of a drain terminal 1 and a part of an image signal line DL are formed. In this case, as illustrated in FIG. 11B, an end of part of the image signal line DL which is composed of the first conductive film g1 is positioned inwardly of an insulating film GI. Next, a resist is removed by use of the peeling liquid S502 (the brand name), and thereafter ashing of $O_2$ is effected for one minute. The next step is to provide a second conductive film g2 composed of aluminum-paladium (Pd), aluminum-silicon, aluminum-silicon-titanium (Ti) or aluminum-silicon-copper (Cu) to have a thickness of 1000 [Å] by sputtering. Subsequently, the second conductive film g2 is selectively etched by photoetching which involves the use of a mixture of phosphoric acid, nitric acid and acetic acid as an etching liquid, thus forming a second layer of the scanning signal line GL, and simultaneously disposing the second conductive film g2 on the first conductive film g1 of part of the image signal line DL and the drain terminal 1. In this case, as depicted in FIG. 11B, an end of the second conductive film g2 on the first conductive film g1 of part of the image signal line DL and the drain terminal 1 is positioned approximately 10 [μm] away from an end of an insulating film GI. An $SF_6$ gas is introduced into the dry etching unit, and the resist is eliminated after removing a residue of silicon. An ammonia gas, a silane gas and a nitrogen gas are introduced into the plasma CVD device to form a nitride silicon film having a thickness of 3500 [Å]. Thereafter, the silane gas, a hydrogen gas and a phosphine gas are introduced into the plasma CVD device to form an i-type amorphous silicon film having a thickness of 2100 [Å] and an N+-type silicon film having a thickness of 300 [Å]. In the wake of this process, the N+-type silicon film and the i-type amorphous silicon film are selectively etched by photoetching which employs $SF_6$ and $CCl_4$ as a dry etching gas, thereby forming an i-type semiconductor layer AS. After removing the resist, a resist 2 is provided, and the nitride silicon film is selectively etched by use of $SF_6$ as a dry etching gas, with the result that an insulating film GI is formed. Before eliminating the resist 2, as illustrated in FIG. 1(k), the second conductive film g2 disposed on the first conductive film g1 of part of the image signal line DL, and the drain terminal 1 is removed by using the developer NMD (the brand name) and a mixture of the phosphoric acid, the nitric acid and the acetic acid. After eliminating the resist 2, as illustrated in FIG. 1(c), a first conductive film d1 of chromium having a thickness of 600 [Å] is formed by sputtering. Then, the first conductive film d1 is selectively etched by photoetching, thereby forming a first layer of an image signal line DL, a source electrode SD1 and a drain electrode SD2 and also a second layer of the drain terminal 1. Subsequently, before removing the resist, $CCl_4$ and $SF_6$ are introduced into the dry etching unit, and the N+-type silicon film is selectively etched, thus forming an N+-type semiconductor layer d0. After eliminating the resist, ashing of $O_2$ is effected for one minute. Next, as shown in FIG. 1(m), a second conductive film d2 made of a aluminum-paladium (Pd), aluminum-silicon, aluminum-silicon-titanium (Ti) or aluminum-silicon-copper (Cu) is formed up to 3500 [Å] by sputtering. The second conductive film d2 is selectively etched by photoetching, thereby forming a second layer of the image signal line DL, the source electrode SD1 and the drain electrode SD2, and also providing the second conductive film d2 on the first conductive film d1 of the drain terminal 1. In this case, as illustrated in FIG. 12B, the end of the second conductive film d2 disposed on the first conductive film d1, which constitutes the second layer of the drain terminal 1, is positioned outwardly of an end of a protect film PSV1. After removing the resist, the ashing process of $O_2$ is carried out for one minute. A third conductive film d3 formed of an ITO film having a thickness of 1200 [Å] is provided by sputtering. The third conductive film d3 is selectively etched by photoetching which involves the use of a mixture of hydrochloric acid and nitric acid as an etching liquid, thereby forming a third layer of the image signal line DL, the source electrode SD1 and the drain electrode SD2 and also a transparent pixel electrode ITO1. The resist is eliminated, and thereafter an ammonia gas, a silane gas and nitrogen gas are introduced into the plasma CVD device, whereby a nitride silicon film that is 1 [μm] thick is formed. Next, a resist 3 is shaped, and the nitride silicon film is selectively etched by use of $SF_6$ as a dry etching gas, thus forming a protect film PSV1. As depicted in FIG. 1(n), before removing the resist 3, the second conductive film d2 on the first conductive film d1 of the drain terminal 1 is removed by using the developer NMD and the mixture of phosphoric acid, nitric acid and acetic acid. Subsequently, an ITO film 4 with a thickness of 1200 [Å] is formed by sputtering. Then, the ITO film 4 is selectively etched by photoetching which involves the use of the mixture of hydrochloric acid and nitric acid as an etching liquid to thereby form a third layer of the drain terminal 1.

In the method of manufacturing the liquid crystal display device, there are formed the first layer of the scanning signal line GL by use of the first conductive film g1, the gate electrode GT and the electrode of the holding capacity element Cadd; and concurrently, the first layer of the drain terminal 1 and the part of the image signal line DL are provided. The formations of the first layer of the scanning signal line GL, the gate electrode GT, the electrode of the holding capacity element Cadd and the insulating film GI hinders the contamination on the lower surface of the first layer of the terminal 1 of the lower transparent glass substrate SUB1, as a result of which the drain terminal 1 is not peeled off at all. Since the end of part of the image signal line DL which is composed of the first conductive film g1 is located in-wardly of the insulating film GI, the disconnection of the image signal line DL can be avoided. Besides, the second conductive film g2 which is used to constitute the second layer of the scanning signal line GL is formed on the first conductive film g1 which shapes the first layer of the drain terminal 1. After forming the insulating film GI, the second conductive film g2 disposed on the first conductive film g1 of the drain terminal 1 is removed, which arrangement prevents the contamination on the surface of the first conductive film g1 of the drain terminal 1. It is therefore possible to prevent the debasement of contact between the first conductive film d1 and the first conductive film g1 of part of the image signal line DL and the drain terminal 1. In addition, the second conductive film d2 which is to constitute the second layer of the image signal line DL is formed on the first conductive film d1 shaping the second layer of the drain terminal 1, and the protect film PSV1 is provided. Thereafter, the second conductive film d2 on the second layer of the drain terminal 1 is eliminated, thereby steering clear of the contamination on the surface of the first conductive film d1 which forms the second layer of the drain terminal 1. Hence, it is feasible to prevent the decline of contact between the first conductive film d1 of the drain terminal 1 and the ITO film 4.

Figure 13M:
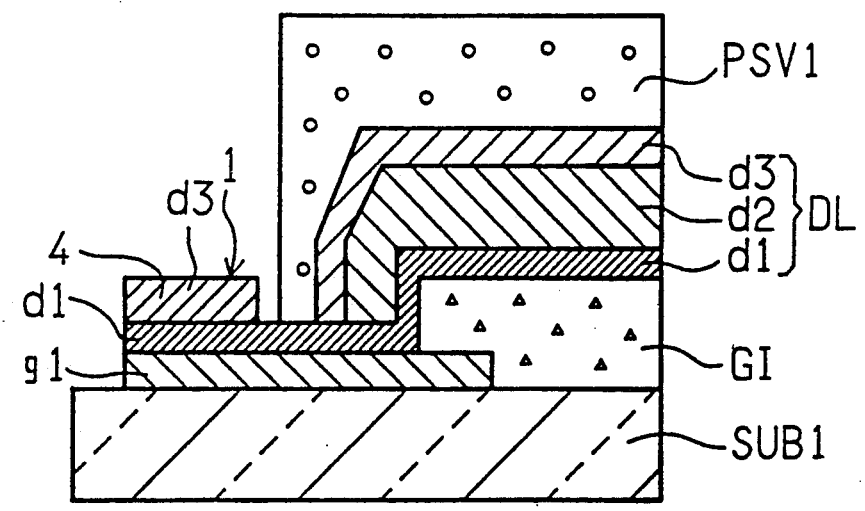

Another method of manufacturing the active matrix color liquid crystal display device according to the present invention will be explained with reference to FIG. 13. To begin with, as illustrated in FIG. 13(j), the first conductive film g1 is provided on the lower transparent glass substrate SUB1 by sputtering. Next, the first conductive film g1 is selectively etched for forming a first layer of the scanning signal line GL, a gate electrode GT, a first layer of the drain terminal 1 and an electrode of the holding capacity element Cadd and the part of the image signal line DL. Simultaneously, the first layer of the drain terminal 1 and the part of the image signal line DL are provided. Subsequent to this step, a second conductive film g2 is formed by sputtering. Then, the second conductive g2 is selectively etched, thereby shaping a second layer of the scanning signal line GL. The resist is removed, and, after providing a nitride silicon film, an i-type amorphous silicon film and an N+-type silicon film are formed. In the wake of this step, the N+-type silicon film and the i-type amorphous silicon film are selectively etched preparatory to formation of an i-type semiconductor layer AS. After eliminating the resist, a resist 2 is provided, and the nitride silicon film undergoes selective etching to form an insulating film GI. In the second place, before removing the resist 2, the surface of the first conductive film g1 of part of the image signal line DL and the drain terminal 1 is treated by use of a mixture of hydrochloric acid and nitric acid. Next, as depicted in FIG. 13(k), after removing the resist 2, a first conductive film d1 is shaped by sputtering. The first conductive film d1 is selectively etched to form a first layer of the image signal line DL, the source electrode SD1 and the drain electrode SD2 and also a second layer of the drain terminal 1. Subsequently, before eliminating the resist, an N+-type silicon film undergoes selective etching, thereby providing an N+-type semiconductor layer d0. After eliminating the resist, as depicted in FIG. 13(l), a second conductive film d2 is formed by sputtering. The second conductive film d2 is selectively etched to provide a second layer of the image signal line D1, the source electrode SD1 and the drain electrode SD2. Subsequent to this step, after removing the resist, a third conductive film d3 is shaped by sputtering. The third conductive film d3 is subjected to selective etching for providing a third layer of the image signal line DL, the source electrode SD1 and the drain electrode SD" and also a transparent pixel electrode ITO1. A nitride silicon film is formed after eliminating the resist. Then, a resist 3 is provided, and the nitride silicon film is selectively etched, thereby forming a protect film PSV1. Next, before removing the resist 3, a surface treatment is effected on the first conductive film d1 constituting the second layer of the drain terminal 1 by using a mixture of hydrochloric acid and nitric acid. As shown in FIG. 13(m), the resist 3 is removed, and thereafter an ITO film 4 is formed on the basis of the sputtering process. The ITO film 4 is selectively etched to form a third layer of the drain terminal 1.

Based on this method of manufacturing the liquid crystal display device, after the insulating film GI has been shaped, the surface treatment is performed on the first conductive film g1 constituting the part of the image signal line DL and the first layer of the drain terminal 1, which involves the use of the mixture of hydrochloric acid and nitric acid. It is therefore possible to purge the surface of the first conductive film g1 which shapes the part of the image signal line DL and the first layer of the drain terminal 1. This, in turn, prevents the deterioration of contact between the first conductive film d1 and the first conductive film g1 of part of the image signal line DL and the first layer of the drain terminal 1. After forming the protect film PSV1, the surface of the first conductive film d1 serving as the second layer of the drain terminal 1 is treated by use of the mixture of hydrochloric acid and nitric acid. Thus, the surface of the first conductive film d1 shaping the second layer of the drain terminal 1 can be cleansed. This makes it feasible to prevent the decline of contact between the first conductive film d1 of the drain terminal 1 and the ITO film 4.

The present invention has been discussed in a specific manner on the basis of the foregoing embodiments. The present invention is not limited to those embodiments. As a matter of course, a variety of modifications can be effected without departing from the gist thereof.

For instance, the present invention can be applied to a liquid crystal display device arranged such that each pixel of a liquid crystal display device is arranged so that each pixel of a liquid crystal display unit is split into two or four. If the number of divided sub-pixels is too large, however, a numerical aperture is decreased. Hence, as stated earlier, it is desirable that the pixel be divided into two or four. Even if the pixel is not split, the light shielding effects can also be obtained. The embodiments given above have dealt with a reversed stagger structure used, for example, to provide a configuration such as the order of the gate electrode, the semiconductor layer, and the source/drain electrode. The present invention is also available for a stagger structure in which its up-and-down relationship or the order of formation is reversed to the former.

As discussed above, on the basis of the method of manufacturing the liquid crystal display device of the invention, simultaneously when forming the first conductive film which is to constitute the second layer of the first signal line, the first conductive film is disposed on the first layer of the terminal. After shaping the insulating film employed as a gate insulating film, the first conductive film on the first layer of the terminal is removed, which obviates the contamination on the surface of the first layer of the terminal. It is therefore possible to prevent a decline of condition under which the first layer of the terminal is brought into contact with the second layer, thereby reducing the resistance of the terminal.

Besides, the insulating film is formed, and the surface of the terminal first layer is treated by use of acids, thus purging the surface thereof. This leads to the prevention of the deterioration of contact between the first layer of the terminal and the second layer thereof, whereby the terminal resistance can be decreased.

Furthermore, the third conductive layer which is to shape the second layer of the second signal line is formed, and, at the same time, the third conductive layer is provided on the terminal. After forming the protect film, the third conductive film disposed on the terminal is eliminated, so that the terminal surface is not contaminated. It is therefore feasible to obviate the deterioration of contact between the terminal and the topmost layer, resulting in a decrease in resistance of the terminal.

After shaping the protect film, the second layer surface of the terminal is treated by the acids to cleanse the surface thereof, whereby a condition under which the terminal comes in contact with the topmost layer is not deteriorated. This makes it possible to reduce the terminal resistance.

In the method of manufacturing the liquid crystal display device of the invention, concurrently when forming the first conductive film which is to shape the first signal line, the first layer of the terminal connected to the second signal line is formed. The formations of the first signal line and of the insulating film conceived as the gate insulating film serve to obviate the probability that the surface of the substrate disposed under the first layer of the terminal is contaminated, as a result of which the terminal is not peeled off.

The second conductive film which is to constitute the second layer of the first signal line is formed, and, at the same time, the second conductive film is provided on the first layer of the terminal. After shaping the insulating film used as the gate insulating film, the second conductive film on the first layer of the terminal is removed, thereby preventing the contamination on the surface of the first layer thereof. Hence, it is feasible to hinder the deterioration of contact between the first layer of the terminal and the second layer.

In addition, the insulating film is formed, and the first layer surface of the terminal is treated by the acids, thus cleansing the surface thereof. This prevents the deterioration of contact between the first layer of the terminal and the second layer thereof.

Simultaneous with forming a fourth conductive film which is to shape the second layer of the second signal line, the fourth conductive film is provided on the second layer of the terminal. Subsequently, the protect film is formed, and thereafter the fourth conductive film disposed on the second layer of the terminal is removed, with the result that the surface of the second layer thereof is not contaminated. It is therefore possible to prevent the deterioration of the contact between the second layer of the terminal and the third layer thereof.

Moreover, after the protect film has been shaped, the surface of the second layer of the terminal is treated by the acids, thus purging the surface thereof. The decline in condition under which the second layer of the terminal comes in contact with the third layer thereof can be prevented.

As described above, the present invention exhibits remarkable effects.

What is claimed is:

1. A thin-film device comprising: a substrate;
   an external terminal for electrical connection with an external circuit;
   a first wiring including aluminum formed over said substrate;
   an insulating layer formed over said substrate and over said first wiring to cover substantially all of said first wiring, wherein said external terminal is not covered by said insulating layer; and
   a second interconnection wiring formed of a different material than said first wiring, said second wiring electrically connecting said first wiring with said external terminal, wherein said insulating layer covers a part of said second wiring so that a first portion of said second wiring is covered by said insulating layer and a second portion of said second interconnection wiring is not covered by said insulating layer so that said first wiring is electrically connected with said external terminal via said second wiring without being exposed from said insulating layer.

2. A thin-film device according to claim 1 wherein said external terminal includes a transparent conductive layer covering the exposed portion of said second wiring.

3. A thin-film device with a substrate over a principal surface of which is laminated a thin-film structure comprising:
   a plurality of thin-film transistors each including a gate, a source and a drain;
   a plurality of signal interconnection lines each electrically connecting predetermined ones of said sources and drains of said transistors associated therewith;
   a first-level conducting film formed over said principal surface of said substrate;
   a second-level conducting film comprised of aluminum formed over said principal surface of said substrate;
   a plurality of gate interconnection lines electrically connecting said gates of said transistors associated therewith, wherein at least a portion of each of said gate interconnection lines is formed by said second-level conducting film;
   a third-level insulating film formed over said principal surface of said substrate to substantially completely cover said transistors and said second-level conducting film so that said transistors and said second-level conducting film are not exposed from said third-level insulating film;
   a plurality of gate external terminals which are not covered by said third-level insulating film; and
   a plurality of interconnection wirings which are formed at least partially of said first-level conducting film, wherein said interconnection wirings include a first portion covered with said insulating film and a second portion not covered by said insulating film so that each of said gate interconnection lines is electrically connected to each of said terminals via one of said interconnection wirings without being exposed from said insulating film.

4. The thin-film device according to claim 3, wherein said thin-film structure further comprises a fourth-level transparent conducting film forming a plurality of pixel electrodes each electrically connected with the other of said sources and drains of associated ones of said transistors and covering a surface of each of said gate external terminal.

5. The thin-film device according to claim 4, wherein said first-level conducting film is comprised of chromium.

6. The thin-film device according to claim 3, wherein said second-level film is formed after the formation of said first-level film, and wherein said third-level film is formed after the formation of said second-level film.

7. The thin-film device according to claim 4, wherein said second-level film is formed after the formation of said first-level film, said third-level film is formed after the formation of said second-level film, and said fourth-level film is formed after the formation of said second-level film and before the formation of said third-level film.

8. A thin-film device with a substrate over a principal surface of which is laminated a thin-film structure comprising:
   a plurality of thin-film transistors each including a gate, a source and a drain;
   a plurality of gate interconnection lines each electrically connecting said gates of said transistors associated therewith;
   a first-level conducting film formed over said principal surface of said substrate;
   a second-level conducting film comprised of aluminum formed over said principal surface of said substrate;
   a plurality of signal interconnection lines electrically connecting predetermined ones of said sources and drains of said transistors associated therewith, wherein at least a portion of each of said gate interconnection lines is formed by said second-level conducting film;
   a third-level insulating film formed over said principal surface of said substrate to substantially completely cover said transistors and said second-level conducting film so that said transistors and said second-level conducting film are not exposed from said third-level insulating film;
   a plurality of signal external terminal which are not covered by said third-level insulating film; and
   a plurality of interconnection wirings which are formed at least partially of said first-level film, wherein said interconnection wirings include a first portion covered with said insulating film and a second portion not covered by said insulating film so that each of said signal interconnection lines is electrically connected to each of said terminals via one of said interconnection wirings without being exposed from said insulating film.

9. The thin-film device according to claim 8, wherein said thin-film structure further comprises a fourth-level transparent conducting film forming a plurality of pixel electrodes each electrically connected with the other of said sources and drains of associated one of said transistors and covering a surface of each of said signal external terminals.

10. The thin-film device according to claim 9, wherein said first-level conducting film is comprised of chromium.

11. The thin-film device according to claim 8, wherein said second-level film is formed after the formation of said first-level film and wherein said third-level film, is formed after the formation of said second-level film.

12. The thin-film device according to claim 11, wherein said thin-film structure further comprises a fourth-level insulating film which is useful for the insulation between said gate lines and said signal lines and is formed after the formation of said first-level film and before the formation of said third-level film and each of said signal interconnection lines is electrically connected with each of said first portions at an area free from said fourth-level film.

13. The thin-film device according to claim 12, wherein said thin-film structure further comprises a fifth-level conducting film and each of said signal interconnection lines is electrically connected with each of said first portions at said area via said fifth-level conducting film.

* * * * *